(12) United States Patent
Patel et al.

(10) Patent No.: US 12,088,897 B1
(45) Date of Patent: Sep. 10, 2024

(54) CAMERA MODULE FLEXURE WITH SEGMENTED BASE LAYER

(71) Applicant: Apple Inc., Cupertino, CA (US)

(72) Inventors: Himesh Patel, Fremont, CA (US); Kai Min, San Jose, CA (US); Phillip R Sommer, Newark, CA (US); Qiang Yang, Fremont, CA (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 17/932,619

(22) Filed: Sep. 15, 2022

(51) Int. Cl.
*H04N 23/54* (2023.01)
*H04N 23/52* (2023.01)
*H04N 23/57* (2023.01)
*H04N 23/68* (2023.01)
*G03B 3/10* (2021.01)

(52) U.S. Cl.
CPC .............. *H04N 23/54* (2023.01); *H04N 23/52* (2023.01); *H04N 23/57* (2023.01); *H04N 23/687* (2023.01); *G03B 3/10* (2013.01)

(58) Field of Classification Search
None
See application file for complete search history.

(56) References Cited

U.S. PATENT DOCUMENTS

| | | | |
|---|---|---|---|
| 11,962,881 B1* | 4/2024 | Patel | H04N 23/665 |
| 11,974,031 B1* | 4/2024 | Patel | H10K 39/32 |
| 2019/0141248 A1* | 5/2019 | Hubert | H04N 23/687 |
| 2020/0212826 A1* | 7/2020 | Hsu | B81B 7/007 |
| 2020/0314338 A1* | 10/2020 | Johnson | H04N 23/68 |
| 2021/0080807 A1* | 3/2021 | Sharma | H04N 23/55 |
| 2021/0314469 A1* | 10/2021 | Shahparnia | G03B 5/02 |
| 2022/0053111 A1* | 2/2022 | Sommer | H04N 23/54 |

* cited by examiner

*Primary Examiner* — Paul M Berardesca
(74) *Attorney, Agent, or Firm* — Robert C. Kowert; Kowert, Hood, Munyon, Rankin & Goetzel, P.C.

(57) ABSTRACT

A flexure for a camera includes a dynamic platform to which an image sensor and a substrate are connected such that the image sensor and the substrate move together with the dynamic platform. A driver associated with an actuator to move the image sensor relative to a lens group is mounted to the substrate. The flexure also includes a static platform connected to a static portion of the camera, a plurality of flexure arms that mechanically connect the dynamic platform to the static platform, a routing layer and a base layer both at least partially forming the dynamic platform, the static platform, and the plurality of flexure arms, and at least one segmentation region extending through the base layer and configured to physically isolate a return current from the driver and through the base layer from a return current from the image sensor and through the base layer.

20 Claims, 20 Drawing Sheets

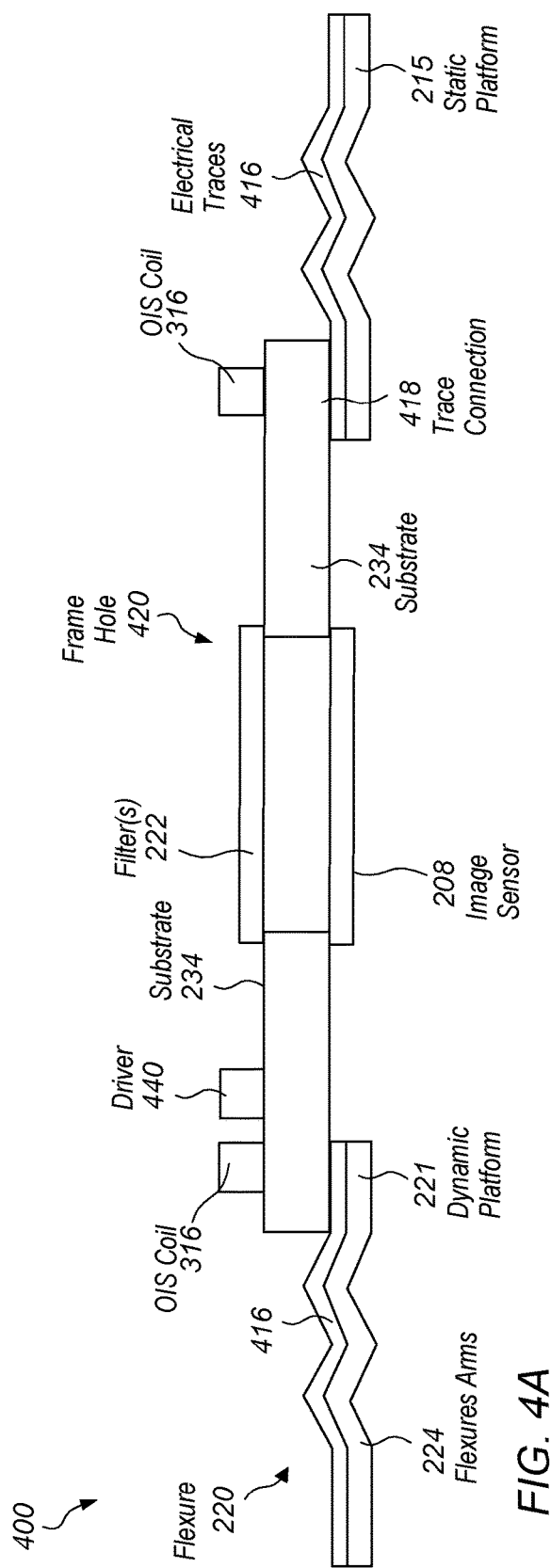
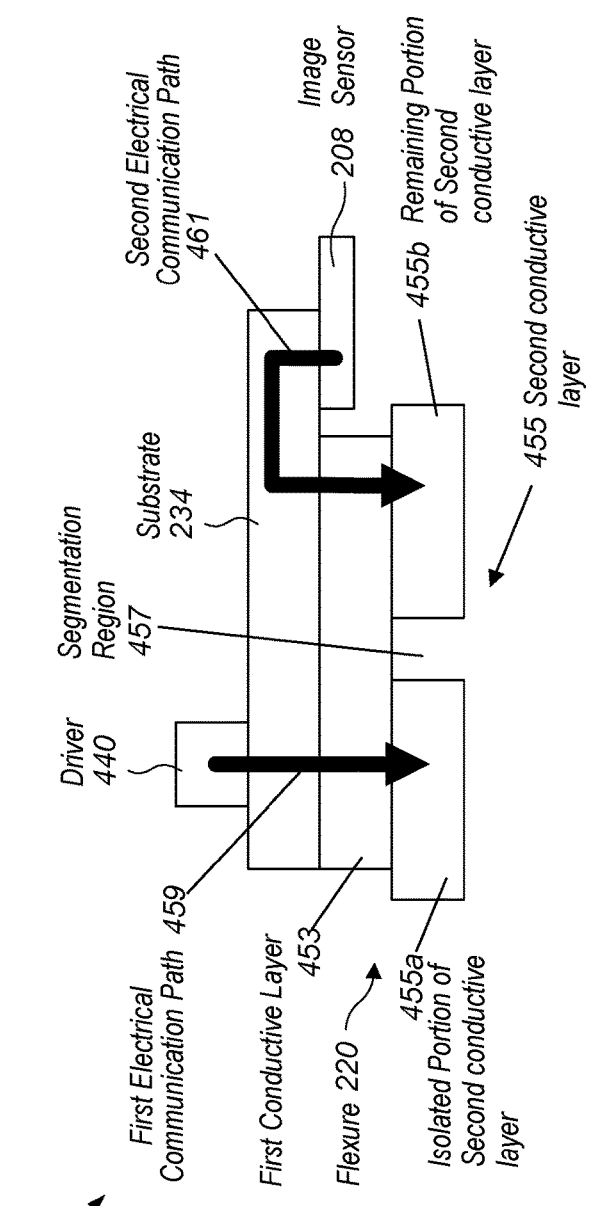
FIG. 4A
FIG. 4B

CAMERA MODULE FLEXURE WITH SEGMENTED BASE LAYER

BACKGROUND

Technical Field

This disclosure relates generally to flexure arm separators for flexures of a camera module.

Description of the Related Art

The advent of small, mobile multipurpose devices such as smartphones and tablet or pad devices has resulted in a need for high-resolution, small form factor cameras for integration in the devices. Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

BRIEF DESCRIPTION OF THE DRAWINGS

FIG. 4A illustrates a cross-sectional view of an example transverse motion voice coil motor (VCM) that may be used, for example, in a camera to provide optical image stabilization, in accordance with some embodiments.

FIG. 4B illustrates a cross-section view of an example flexure assembly including a mounted substrate, in accordance with some embodiments.

Figure 1:
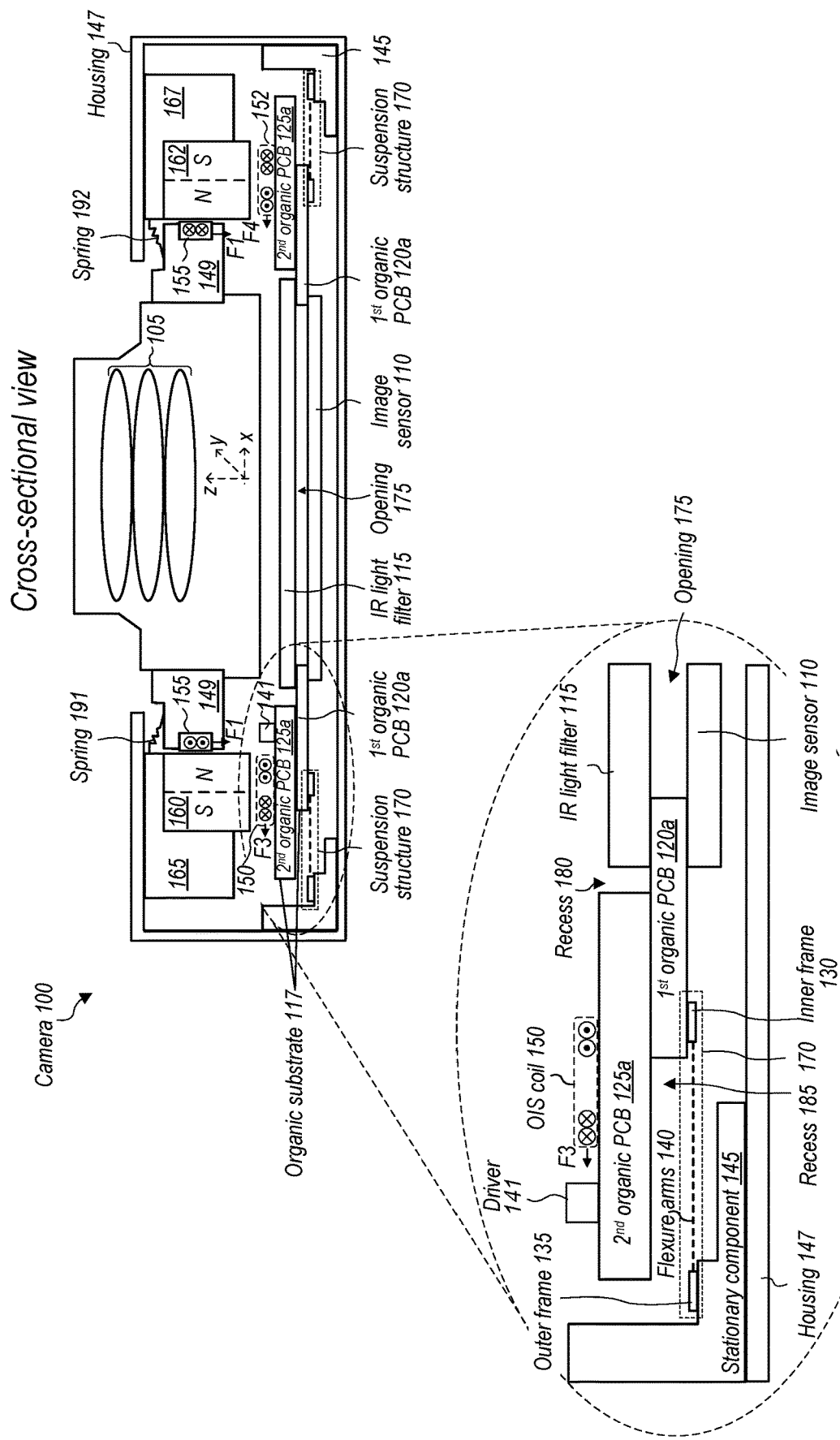
FIG. 1 is a simplified block diagram illustrating an example camera including an organic substrate for placement of one or more components, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a flexure module that may be used in a camera with a moveable image sensor. In some examples, the camera may include camera equipment outfitted with controls, magnets, and voice coil motors to improve the effectiveness of a miniature actuation mechanism for a compact camera module. More specifically, in some embodiments, compact camera modules include actuators to deliver functions such as autofocus (AF) and optical image stabilization (OIS). One approach to delivering a very compact actuator for OIS is to use a Voice Coil Motor (VCM) arrangement.

In some embodiments, a flexure implemented with sensor shift designs may use a base layer or a second conductive layer (e.g., below a routing layer or a first conductive layer) to communicate ground reference signals from the flexure (e.g., from electrical components on a substrate mounted on the flexure, from an AF driver mounted on a substrate attached to the flexure, from the image sensor attached to the flexure) to the system. With multiple component systems, one or more of the components (e.g., an image sensor, AF drivers, OIS drivers) may utilize the routing layer to communicate ground reference signals for mitigating cross-coupling with one or more other ground references signals routed on the base layer. For example, a ground reference signal from an AF driver cross-coupling with a ground reference signal from an image sensor may reduce the image quality of an image captured by the image sensor. However, utilizing the routing layer for communicating one or more ground reference signal may require one or more flexure arms to do so that would otherwise be unnecessary thereby increasing the size of the flexure or that would eliminate the possibility of using those flexure arms for another or additional purpose. For example, because one or more components may use the routing layer for returning ground reference signals, the flexure may be larger than necessary due to the additional signal traces on the additional flexure arms needed for returning the ground reference signals. As another example, because one or more components may use the routing layer for returning ground reference signals, the signal traces on the flexure arms used for returning the ground reference signals may be unavailable for power optimization. As yet another example, because one or more components may use the routing layer for returning ground reference signals, the electrical pads needed for the signal traces of the flexure arms carrying the ground reference signals may increase the total number of electrical pads and thus may increase the size of the ledge where the electrical pads reside. As described herein, one or more portions of the base layer may be segmented or isolated from one or more remaining portions of the base layer so that two or more ground reference signals from different electrical components on the flexure (e.g., from the image sensor and from the AF driver) may be routed through the base layer rather than the routing layer while mitigating cross-coupling between the two or more ground reference signals.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

FIG. 1 is a simplified block diagram illustrating an example camera 100 including an organic substrate for placement of one or more components, according to some embodiments. The camera 100 of FIG. 1 may be included with and/or include one or more same or similar features as the features described with respect to or illustrated in FIGS.

2, 3, 4A, 4B, 5, 6A, 6B, 7, 8, 9, 10, 11, 12, 13, 14A, 14B, 14C, 14D, 15, and 16. For purposes of illustration, an optical coordinate system defined by X-Y-Z axes is displayed in FIG. 1, where an optical axis of one or more lenses of the camera is defined as Z-axis. In some embodiments, the optical axis (or Z-axis) may correspond to the transmission path of a principal light ray passing through the lenses to an image sensor of the camera. In some embodiments, the transmission path of the principal light ray within the camera may not necessary be a straight but rather a folded line, e.g., when the camera includes a light folding element that may change the transmission direction of the principal light ray. In that case, the optical axis may refer to any straight portion of the folded line. Further, for purposes of illustration, only relevant components of the camera are shown in the cross-sectional view of the camera in FIG. 1.

As indicated in FIG. 1, in some embodiments, camera 100 may include one or more lenses 105 and image sensor 110. In some embodiments, image sensor 110 may be placed at one side of organic substrate 117. In some embodiments, organic substrate 117 of camera 100 may include two or more separate organic printed circuit boards (PCBs), e.g., organic PCBs 120a and 125a, that may be joined (e.g., soldered) together, as indicated in FIG. 1. Alternatively, in some embodiments, the organic substrate of camera 100 may be one single piece of an organic PCB, as described below in FIGS. 2-3. In this example, image sensor 110 generate one or more image signals based on light passing through one or more lenses 105 along the optical axis (or Z-axis). The image signals may be further processed using a processor to produce one or more images. In some embodiments, one or more lenses 105 may be contained inside lens holder 149. For instance, lens holder 149 may include interior threads, and lenses 105 may be individually screwed to the threads to become affixed with lens holder 149. In some embodiments, one or more additional components of camera 100 may be also placed on organic substrate 117. For instance, in some embodiments, camera 100 may include infrared (IR) light filter 115 mounted to another side of organic PCB 120a of organic substrate 117 that is opposite the side of organic PCB 120a where image sensor 110 may be mounted. As a result, IR light filter 115 may be positioned optically between lenses 105 and image sensor 110 along the optical axis (or Z-axis). Thus, IR light filter 115 may reduce or prevent IR light that passes through lenses 105 from reaching image sensor 110. In some embodiments, organic PCB 120a of organic substrate 117 may further include opening 175 through the body of organic PCB 120, positioned between IR light filter 115 and image sensor 110, to allow light passing through IR light filter 115 to image sensor 110 through opening 175. In some embodiments, organic PCB 120a of organic substrate 117 may include recess 180 (e.g., a cavity or pocket) at the side where IR light filter is mounted, e.g., at least partially overlapping opening 175, such that IR light filter 115 may be placed at least partially within recess 180 of organic PCB 120. Recess 180 may reduce thickness of organic substrate 117 in the area of recess 180 relative to other portions of organic substrate 117, and thus lower the height (also called Z-height) of the overall substrate assembly (including organic substrate 117 and components placed on the organic substrate such as IR light filter 115) along the optical axis (or Z-axis). The Z-height decrease may help to reduce the size of camera 100.

In some embodiments, organic substrate 117 of camera 100 (e.g., including organic PCBs 120a and 125a) may be formed using one or more organic materials, such as poly-imide, ajinomoto build-up film (ABF), polytetrafluoroethylene (PTFE), polyetheretherketone (PEEK), flame retardant woven glass reinforced epoxy resin (FR-4), or other suitable organic materials. In some embodiments, organic substrate 117 (e.g., organic PCBs 120a and/or 125a) may include one more layers or laminations embedded within organic substrate 117, one on top of another. In some embodiments, each of the layer or lamination may be used to route electrical traces for transferring electrical signals. In some embodiments, the electrical signals may include power, ground, and image signals to/from image sensor 110 and a driver 141 (e.g., an autofocus (AF) driver, OIS driver), and other components on the organic substrate. In addition, in some embodiments, the electrical signals may include control and sensing signals to/from other components of on organic substrate 117 to implement OIS and/or AF functions. In some embodiments, some or all of the electrical traces may be formed using copper or other suitable metallic materials. In some embodiments, organic substrate 117 may be part of a rigid-flex circuit. A rigid-flex circuit may refer to a printed circuit including one or more rigid printed circuit boards and one or more flexible printed circuit boards. Some layers of the rigid and flexible printed circuit boards may be connected with each other, such that electrical traces may be continuously routed across the rigid and flexible portions. In that case, organic substrate 117 (as part of a rigid-flex circuit) may be further connected with one or more flexible printed circuits (as another part of the rigid-flex circuit) that may route electrical traces of organic substrate 117 to other rigid printed circuits ((as yet another part of the rigid-flex circuit) and/or other components outside organic substrate 117.

In some embodiments, camera 100 may include a sensor-shift design such that image sensor 110 may be movable relative to lenses 105 in one or more directions. For instance, in some embodiments, camera 100 may include suspension structure 170 that suspends organic PCB 120a of organic substrate 117 (and image sensor 110) from stationary component 145 that is further attached with housing 147 of camera 100. In some embodiments, suspension structure 170 may include inner frame 130 and outer frame 135, two of which may be connected through one or more flexure arms 140. In some embodiments, inner frame 130 may be attached to organic PCB 120, whilst outer frame 135 may be affixed to stationary component 145. As indicated in FIG. 1, in some embodiments, suspension structure 170 may be arranged within a plane (e.g., X-Y plane) orthogonal to the optical axis (or Z-axis). Thus, the compression and stretch of flexure arms 140 may allow organic PCB 120a (and image sensor 110) to move within the plane along X and/or Y-axis orthogonal to the optical axis (or Z-axis).

In some embodiments, camera 100 may include an actuator, such as a VCM actuator, to implement movement of image sensor 110. Given the movement is in the lateral direction(s) orthogonal to the optical axis (or Z-axis), this actuator is also called the OIS actuator in this disclosure. As indicated in FIG. 1, in some embodiments, the OIS actuator may include one or more OIS coils 150 and 152 that may be attached to organic PCB 125a of organic substrate 117, and one or more magnets 160 and 162 that may be affixed with stationary components 165 and 167 that are further attached with housing 147 of camera 100. Camera 100 may use one or more controllers to regulate current flowing through OIS coils 150 and 152, which may interact with the magnetic fields of magnets 160 and 162 to generate motive force (e.g., Lorentz force) F3 and F4 to move OIS coils 150 and 152 (together with organic PCBs 120a and 125a, and image sensor 110). In FIG. 1, the dot in the circle within OIS coil 150, and the cross in the circle within OIS coil 152, may respectively indicate current through the respective OIS coils into and out of the paper. Thus, given the directions of the current of OIS coils 150 and 152, and the polarities of the magnetic fields of magnets 160 and 162, the motive force F3 and F4 may be in the negative direction of X-axis. Thus, image sensor 110 may be moved relative to lenses 105 towards the negative direction of X-axis under the motive force F3 and F4. Accordingly, when the directions of the current of OIS coils 150 and 152 are reversed by the one or more controllers, the directions of the motive force F3 and F4 may change to the positive direction of X-axis. Thus, image sensor 110 may be moved relative to lenses 105 towards the positive direction of X-axis. The amplitudes of the current in OIS coils 150 and 152 may also regulated to control the amplitudes of the motive force F3 and F4. In some embodiments, organic substrate 117 may include another recess 185, e.g., around a periphery near the edge of organic PCB 125. Recess 185 may provide extra spacing between PCB organic 125*a* and flexure arms 140, such that they may not unexpectedly move and collide with each other in a direction parallel to the optical axis (or Z-axis), e.g., during drop or shake of camera 100. In some embodiments, one or more components distinct from image sensor 110 and IR light filter 115, such as the OIS coils, controller(s) of the OIS actuator, and/or position sensor, may be attached to organic PCB 125*a* at the bottom side to utilize the readily-available spacing beneath the organic substrate to reduce the Z-height of the overall substrate assembly.

Note that the cross-sectional view in FIG. 1 only illustrates the structure of camera 100 within the X-Z plane. In some embodiments, the OIS actuator of camera 100 may include one or more additional OIS coils (like OIS coils 150 and 152) and one or more magnets (like magnets 160 and 162) in a cross-sectional view within another plane (e.g., Y-Z plane). Similarly, image sensor 110 may be moved relative to lenses 105 in another direction (e.g., Y-axis) orthogonal to the optical axis (or Z-axis). In short, camera 100 may use the OIS actuator to move image sensor 110 relative to lenses 105 laterally in one or more directions (e.g., along X- and/or Y-axis) orthogonal to the optical axis (or Z-axis) to implement an OIS function. The driver 141 may drive the OIS coils 150 and 152 to move the image sensor 110 relative to the lenses 105 in the x-y plane to implement the OIS function. In addition, in some embodiments, camera 100 may have an additional and/or different suspensions structure (not shown in FIG. 1) such that image sensor 110 may be movable relative to lenses 105 longitudinally parallel to the optical axis (or Z-axis). This may allow camera 100 to adjust the focal distance between image sensor 110 and lenses 105 to perform AF. The driver 141 may drive the AF function to move the image sensor 110 relative to the lenses 105 longitudinally parallel to the optical axis (or Z-axis).

In addition, in some embodiments, lenses 105 may be also movable. For instance, in some embodiments, as indicated in FIG. 1, camera 100 may include a suspension structure having one or more springs 191 and 192 to suspend lens holder 149 (and thus lenses 105) from stationary components 165 and 167 of camera 100. Compression and stretch of springs 191 and 192 may allow lens holder 149 (and lenses 105) to move relative to image sensor 110 longitudinally in a directional parallel to the optical axis (or Z-axis), thus the focal distance between lenses 105 and image sensor 110 may be adjusted. In some embodiments, camera 100 may include an actuator, e.g., such as a VCM actuator, to implement the motion of lenses 105. In this disclosure, this actuator is also called the AF actuator. For instance, as indicated in FIG. 1, in some embodiments, the AF actuator may include one or more AF coils 155 that may be affixed with lens holder 149. In some embodiments, AF coils 155 may be wound around the periphery of lenses 105 within a plane (e.g., X-Y plane) orthogonal to the optical axis (or Z-axis). As indicated in FIG. 1, current flowing through AF coils 105 may interact with the magnetic fields of magnets 160 and 162 to generate motive force (e.g., Lorentz force) F1 to move lenses 105 relative to image sensor 110 in the negative direction of the optical axis (or Z-axis). Similarly, the polarities and/or amplitudes of the current of AF coils 155 may be regulated such that the direction and/or amplitude of the motive force (e.g., Lorentz force) F1 may be controlled to adjust the focal distance between lenses 105 and image sensor 110 along the optical axis (or Z-axis). Alternatively, in some embodiments, camera 100 may not have an AF function, and the focal distance between image sensor 110 and lenses 105 may stay fixed.

Figure 2:
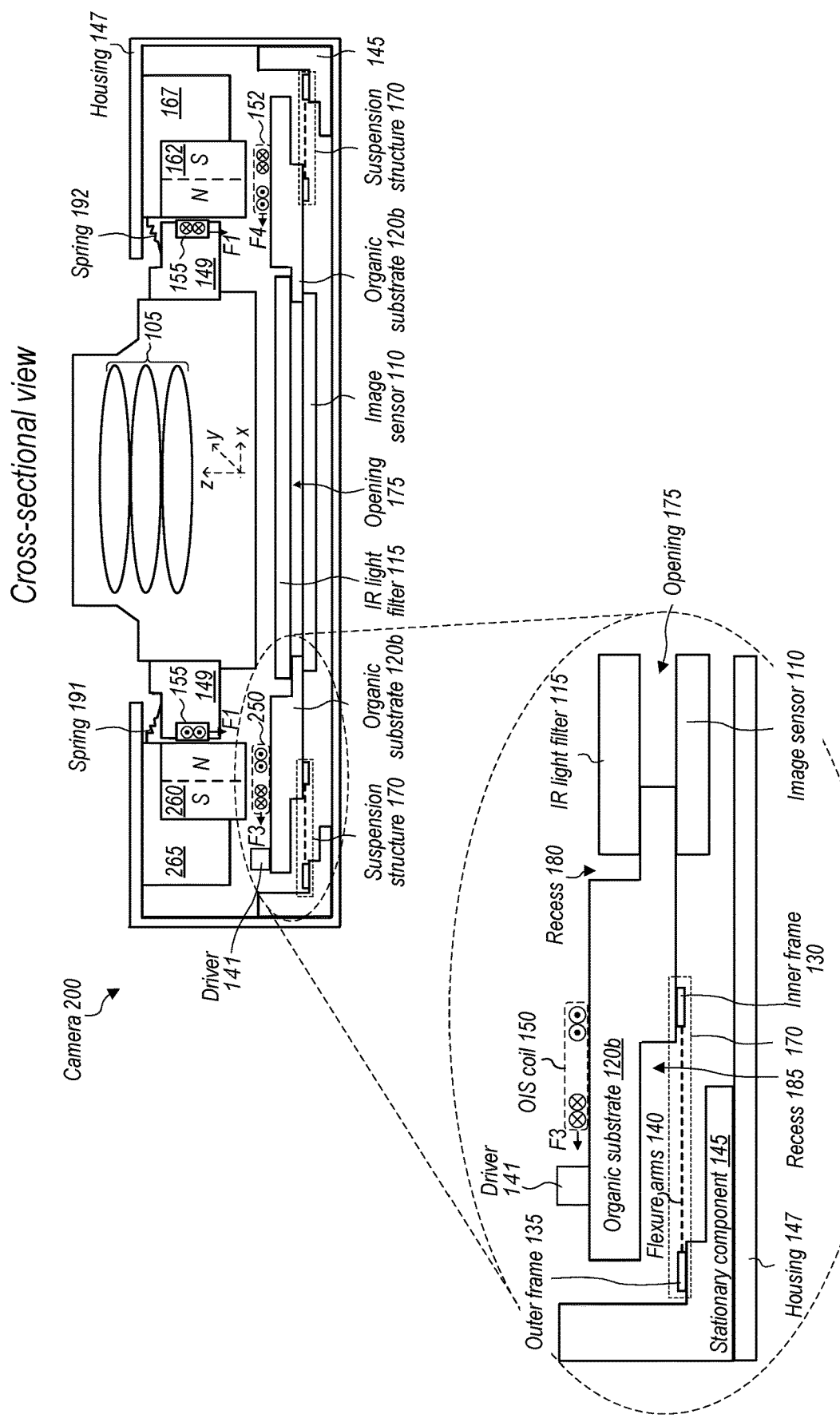
FIG. 2 is a simplified block diagram illustrating another example camera including an organic substrate for placement of one or more components, according to some embodiments.

FIG. 2 is a simplified block diagram illustrating another example camera 200 including an organic substrate for placement of one or more components, according to some embodiments. The camera 200 of FIG. 2 may be included with and/or include one or more same or similar features as the features described with respect to or illustrated in FIGS. 1, 3, 4A, 4B, 5, 6A, 6B, 7, 8, 9, 10, 11, 12, 13, 14A, 14B, 14C, 14D, 15, and 16. As indicated in FIG. 2, camera 200 may have a similar design as camera 100, but with some difference. The camera 200 may also include one or more lenses 105 and image sensor 110. The image sensor 110 may be placed at one side of organic substrate 120*b*, and IR light filter 115 on the opposite side of organic substrate 120*b* facing or towards lenses 105, such that IR light filter 115 may become optically positioned between lenses 105 and image sensor 110 to block or prevent IR light from reaching image sensor 110. Unlike organic substrate 117 of camera 100, the organic substrate 120*b* of camera 200 may be one single piece of an organic PCB. As indicated in FIG. 2, in the cross-sectional view within the X-Z plane, the geometry of an approximately half portion of organic substrate 120*b* may appear as a Z-shape, with a first recess 180 at the same side of organic substrate 120*b* as IR light filter 115, at a position overlapping image sensor 110, and a second recess 185 at the opposite side of organic substrate 120*b* around the periphery of organic substrate 120*b* proximate the edge of the organic substrate. IR light filter 115 may be placed at least partially within recess 180, so that the Z-height of the overall substrate assembly may not be increased significantly by the IR light filter. In addition, organic substrate 120*b* may further include opening 175 through the body of organic substrate 120*b*, positioned between IR light filter 115 and image sensor 110, to enable light passing through IR light filter 115 to reach image sensor 110 through opening 175.

Similarly, in some embodiments, organic substrate 120*b* may be formed using one or more organic materials, such as polyimide, ajinomoto build-up film (ABF), polytetrafluoroethylene (PTFE), polyetheretherketone (PEEK), flame retardant woven glass reinforced epoxy resin (FR-4), or other suitable organic materials. In addition, in some embodiments, organic substrate 120*b* may include one or more layers inside organic substrate 120*b* that may be used to route electrical traces for transferring various electrical signals. In some embodiments, some or all of the electrical traces may be formed using copper.

Like camera 100, camera 200 may also include a sensor-shift design where organic substrate 120*b* and image sensor 110 may be moved, e.g., using an OIS actuator, relative to lenses 105 in one or more directional (e.g., X- and/or Y-axis) orthogonal to the optical axis (or Z-axis). For instance, as indicated in FIG. 2, camera 200 may include the suspension structure 170 including the inner frame 130, the outer frame 135, and the one or more flexure arms 140. The suspension structure 170 may suspend the organic substrate 120*b* and image sensor 110 from stationary component 145 of camera 200 to enable the movability of organic substrate 120*b* and image sensor 110. Further, the OIS actuator may include the one or more OIS coils 150 and 152, and the one or more magnets 160 and 162. The OIS actuator of camera 200 may operate in the similar manner to move organic substrate 120*b* and image sensor 110 relative to lenses 105 laterally in one or more directions (e.g., X- and/or Y-axis) orthogonal to the optical axis (or Z-axis) to perform OIS. The driver 141 may drive the OIS coils 150 and 152 to move the image sensor 110 relative to the lenses 105 in the x-y plane to implement the OIS function. In addition, in some embodiments, camera 200 may be able to move image sensor 110 relative to lenses 105 longitudinally parallel to the optical axis (or Z-axis) to perform AF. The driver 141 may drive the AF function to move the image sensor 110 relative to the lenses 105 longitudinally parallel to the optical axis (or Z-axis) to implement the AF function.

Similar to camera 100, in some embodiments, camera 200 may also be able to move lenses 105, e.g., in a direction parallel to the optical axis (or Z-axis). For instance, as indicated in FIG. 2, in some embodiments, camera 100 may include a suspension structure having the springs 191 and 192 to suspend the lens holder 149 and the lenses 105 from the stationary component 165 and 167 of camera 200. Further, camera 200 may include an AF actuator having the one or more AF coils 155. Like camera 100, camera 200 may use the AF actuator to move the lenses 105 relative to the image sensor 110 longitudinally parallel to the optical axis (or Z-axis) to implement the AF function. In some embodiments, camera 200 may not have an AF function, and the focal distance between the image sensor 110 and the lenses 105 may stay fixed.

Figure 3:
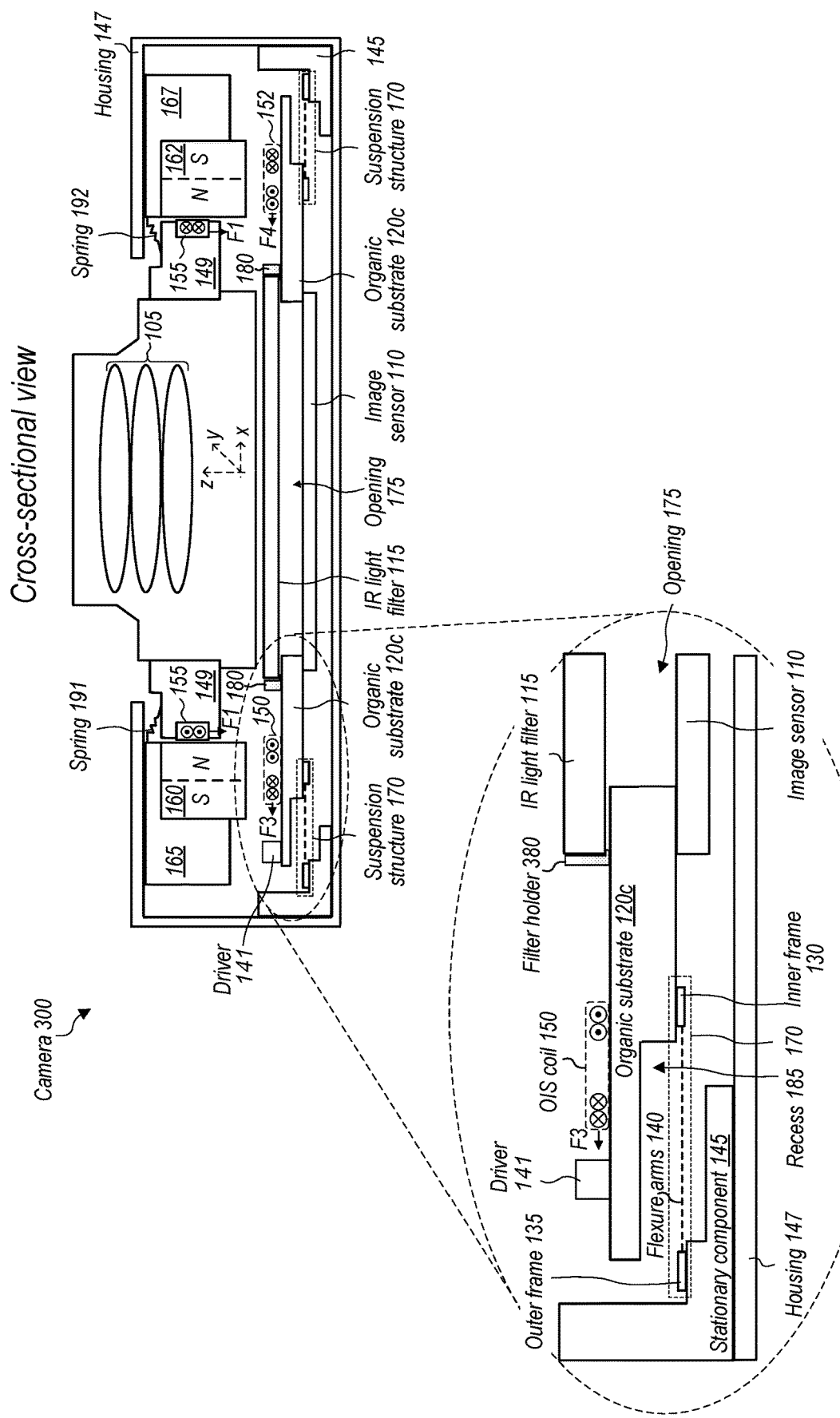
FIG. 3 is a simplified block diagram illustrating yet another example camera including an organic substrate for placement of one or more components, according to some embodiments.

FIG. 3 is a simplified block diagram illustrating yet another example camera 300 including an organic substrate for placement of one or more components, according to some embodiments. The camera 300 of FIG. 3 may be included with and/or include one or more same or similar features as the features described with respect to or illustrated in FIGS. 1, 2, 4A, 4B, 5, 6A, 6B, 7, 8, 9, 10, 11, 12, 13, 14A, 14B, 14C, 14D, 15, and 16. As indicated in FIG. 3, camera 300 may have a similar design as cameras 100 and 200, but with some difference. For instance, in some embodiments, camera 300 may also include the one or more lenses 105 and the image sensor 110. Similarly, the image sensor 110 may be placed at one side of an organic substrate 120*c*, and IR light filter 115 on the opposite side of the organic substrate 120*c* facing or towards the lenses 105, such that the IR light filter 115 may become optically positioned between the lenses 105 and the image sensor 110 to block or prevent IR light from reaching the image sensor 110. Unlike organic substrate 117 of camera 100, the organic substrate 120*c* of camera 300 may be one single piece of an organic PCB. Further different from the organic substrate 120*b* of camera 200, the organic substrate 120*c* may not include a recess (like recess 180) for placing the IR light filter 115. Instead, the IR light filter 115 may be attached on a surface at the top side of the organic substrate 120*c*. Thus, as indicated in FIG. 3, in the cross-sectional view within the X-Z plane, the geometry of an approximately half portion of the organic substrate 120*c* may appear as an inversed L-shape, with only recess 185 at the same side of the organic substrate 120*c* as the image sensor 110 around the periphery of the organic substrate 120*c* proximate the edge of the organic substrate 120*c*. The IR light filter 115 may be attached to the organic substrate 120*c* using glues, or alternatively using filter holder 380. In addition, the organic substrate 120*c* may further include opening 175 through the body of the organic substrate 120*c*, positioned between the IR light filter 115 and the image sensor 110, to enable light passing through the IR light filter 115 to reach the image sensor 110 through the opening 175.

Similarly, in some embodiments, the organic substrate 120*c* may be formed using one or more organic materials, such as polyimide, ajinomoto build-up film (ABF), polytetrafluoroethylene (PTFE), polyetheretherketone (PEEK), flame retardant woven glass reinforced epoxy resin (FR-4), or other suitable organic materials. In addition, in some embodiments, the organic substrate 120*c* may include one or more layers inside the organic substrate 120*c* that may be used to route electrical traces for transferring various electrical signals. In some embodiments, some or all of the electrical traces may be formed using copper.

Like cameras 100 and 200, camera 300 may also include a sensor-shift design where the organic substrate 120*c* and image sensor 110 may be moved, e.g., using an OIS actuator, relative to the lenses 105 in one or more directional (e.g., X- and/or Y-axis) orthogonal to the optical axis (or Z-axis). For instance, as indicated in FIG. 3, camera 300 may include the suspension structure 170 including the inner frame 130, the outer frame 135, and the one or more flexure arms 140. The suspension structure 170 may suspend the organic substrate 120*c* and image sensor 110 from stationary component 145 of camera 300. Further, the OIS actuator may include the one or more OIS coils 150 and 152, and the one or more magnets 160 and 162. Like the OIS actuators of cameras 100 and 200, the OIS actuator of camera 300 may operate in the similar manner to move the organic substrate 120*c* and the image sensor 110 relative to the lenses 105 laterally in one or more directions (e.g., X- and/or Y-axis) orthogonal to the optical axis (or Z-axis) to perform OIS. The driver 141 may drive the OIS coils 150 and 152 to move the image sensor 110 relative to the lenses 105 in the x-y plane to implement the OIS function. In addition, in some embodiments, camera 300 may be able to move the image sensor 110 relative to the lenses 105 longitudinally parallel to the optical axis (or Z-axis) to perform AF. The driver 141 may drive movement of the image sensor 110 relative to the lenses 105 in the z-plane to implement the AF function.

Similar to cameras 100 and 200, in some embodiments, camera 300 may also be able to move the lenses 105, e.g., in a direction parallel to the optical axis (or Z-axis). For instance, as indicated in FIG. 3, in some embodiments, camera 300 may include a suspension structure having the springs 191 and 192 to suspend the lens holder 149 and the lenses 105 from the stationary component 165 and 167 of camera 300. Further, camera 300 may include an AF actuator having one or more AF coils 155 (like AF coils 155 and 255). Like cameras 100 and 200, camera 300 may use the AF actuator to move lenses 105 relative to the image sensor 110 longitudinally parallel to the optical axis (or Z-axis) to implement the AF function. In some embodiments, camera 300 may not have an AF function, and the focal distance between image sensor 110 and lenses 105 may stay fixed. The driver 141 (e.g., an autofocus driver) may drive the AF coils 155 to move the lenses 105 relative to the image sensor 110 longitudinally parallel to the optical axis (or Z-axis) to implement the AF function.

In addition to the benefits described above, the variations in the design of cameras 100, 200, and 300 may provide further features, according to some embodiments. For instance, in some embodiments, compared to a "benchmark" hybrid substrate including an organic PCB and a ceramic PCB, camera 100 that includes organic substrate 117 having multiple separate organic PCBs 120a and 125a joined together may accommodate the same number of layers as the hybrid substrate but with a reduced Z-height. In some embodiments, camera 200 that includes a Z-shape organic substrate 120b may have more embedded layers than the hybrid substrate. In some embodiments, camera 300 that includes a L-shape organic substrate 120c may transfer the same amount of electrical signals as the hybrid substrate under an approximately same Z-height, but using a less number of embedded layers even mounting an IR light filter at the surface of the organic substrate. Further, because the L-shape organic substrate 120c in camera 300 eliminates one recess at the side of the organic substrate towards the lenses, it may be easier to apply a silicon resin (SR) coating to cover the organic substrate. The SR coating may protect particles falling from the organic substrate to reach other components of the camera. In some embodiments, the particles on a lens, image sensor, and/or IR light filter may negatively impact quality of the generated images. They may also cause reliability problems.

FIG. 4A illustrates a cross-sectional view of an example transverse motion voice coil motor (VCM) 400 that may be used, for example, in a camera to provide optical image stabilization (OIS), in accordance with some embodiments. The VCM 400 may be included with and/or include one or more same or similar features as the features described with respect to or illustrated in FIGS. 1, 2, 3, 4B, 5, 6A, 6B, 7, 8, 9, 10, 11, 12, 13, 14, 15, and 16. In some embodiments, the transverse motion VCM 400 may include a flexure 220 (e.g., suspension structure 170 illustrated in FIGS. 1, 2, and 3), an image sensor 208 (e.g., image sensor 110 illustrated in FIGS. 1, 2, and 3), substrate 234 (e.g., organic substrate 117 illustrated in FIG. 1, organic substrate 120b illustrated in FIG. 2, organic substrate 120c illustrated in FIG. 3), an OIS coil 316 (e.g., OIS coil 150 illustrated in FIGS. 1, 2, and 3). The flexure 220 may include the dynamic platform 221 (e.g., inner frame 130 illustrated in FIGS. 1, 2, and 3), a static platform 215 (e.g., outer frame 135 illustrated in FIGS. 1, 2, and 3), and one or more flexure arms 224 (e.g., flexure arms 140 illustrated in FIGS. 1, 2, 3). The flexure arms 224 may connect the dynamic platform 221 to the static platform 215. In some examples, one or more of the flexure arms 224 may include one or more electrical traces 416 routed between the static platform 215 and the dynamic platform 221 and/or the substrate 234.

In some embodiments, the image sensor 208 may be attached to or otherwise integrated into the substrate 234 such that the image sensor 208 is connected to the flexure 220 via the substrate 234. In some examples, there may be one or more trace connections 418 between the substrate 234 and the flexure 220. In some cases, the flexure 220 may have a hole 420 extending therethrough, and filter(s) 222 and the image sensor 208 may be placed over openings of the hole 420. This may allow for a reduction in z height (e.g., the height of the transverse motion VCM 400 along an optical axis of the camera) in some cases.

In some examples, the substrate 234 may extend from the dynamic platform 221 such that a portion of the substrate 234 is positioned over the flexure arms 224 (e.g., in a plane above the flexure arms 224). In some examples, at least a portion of each of the OIS coils 316 to be positioned above the flexure arms 224. Such an arrangement may facilitate miniaturization of the transverse motion VCM 400 and/or the camera, as the dynamic platform 221 need not be sized to accommodate both the image sensor 208 and the OIS coils 316.

FIG. 4B illustrates a cross-section view of an example flexure assembly 451 including a mounted substrate, in accordance with some embodiments. The flexure assembly 451 may be included with and/or include one or more same or similar features as the features described with respect to or illustrated in FIGS. 1, 2, 3, 4A, 5, 6A, 6B, 7, 8, 9, 10, 11, 12, 13, 14A, 14B, 14C, 14D, 15, and 16. In some embodiments, the flexure assembly 451 may include the flexure 220, the image sensor 208, the substrate 234, and/or the driver 440. The flexure 220 may include the dynamic platform 221, a static platform 215, and one or more flexure arms 224. The flexure arms 224 may connect the dynamic platform 221 to the static platform 215. In some examples, one or more of the flexure arms 224 may include one or more electrical traces 416 routed between the static platform 215 and the dynamic platform 221 and/or the substrate 234. The flexure 220 may be at least partially formed by a first conductive layer 453 (e.g., a signal trace layer) and a second conductive layer 455 (e.g., a ground layer). A segmentation region 457 may divide the second conductive layer 455 into two regions. For example, the segmentation region 457 may physically isolate an isolated portion of the second conductive layer 455a from a remaining portion of the second conductive layer 455b.

In some aspects, the driver 440 may communicate a return signal through the substrate 234 and through the flexure 220. Similarly, the image sensor 208 may communicate a return signal through the substrate and through the flexure 220. As shown in FIG. 4B, the driver 440 may communicate its return signal through a first electrical communication path 459 that extends through the substrate 234, through the first conductive layer 453, and through the isolated portion of the second conductive layer 455a. The image sensor 208 may communicate its return signal through a second electrical communication path 461 that extends through the substrate 234, through the first conductive layer 453, and through the remaining portion of the second conductive layer 455b. The first electrical communication path 459 and the second electrical communication path 461 may be separated from each other from the driver 440 and the image sensor 208, respectively, and through the flexure 220 for as great as distance as possible to reduce the likelihood of cross-coupling between signals.

Figure 5:
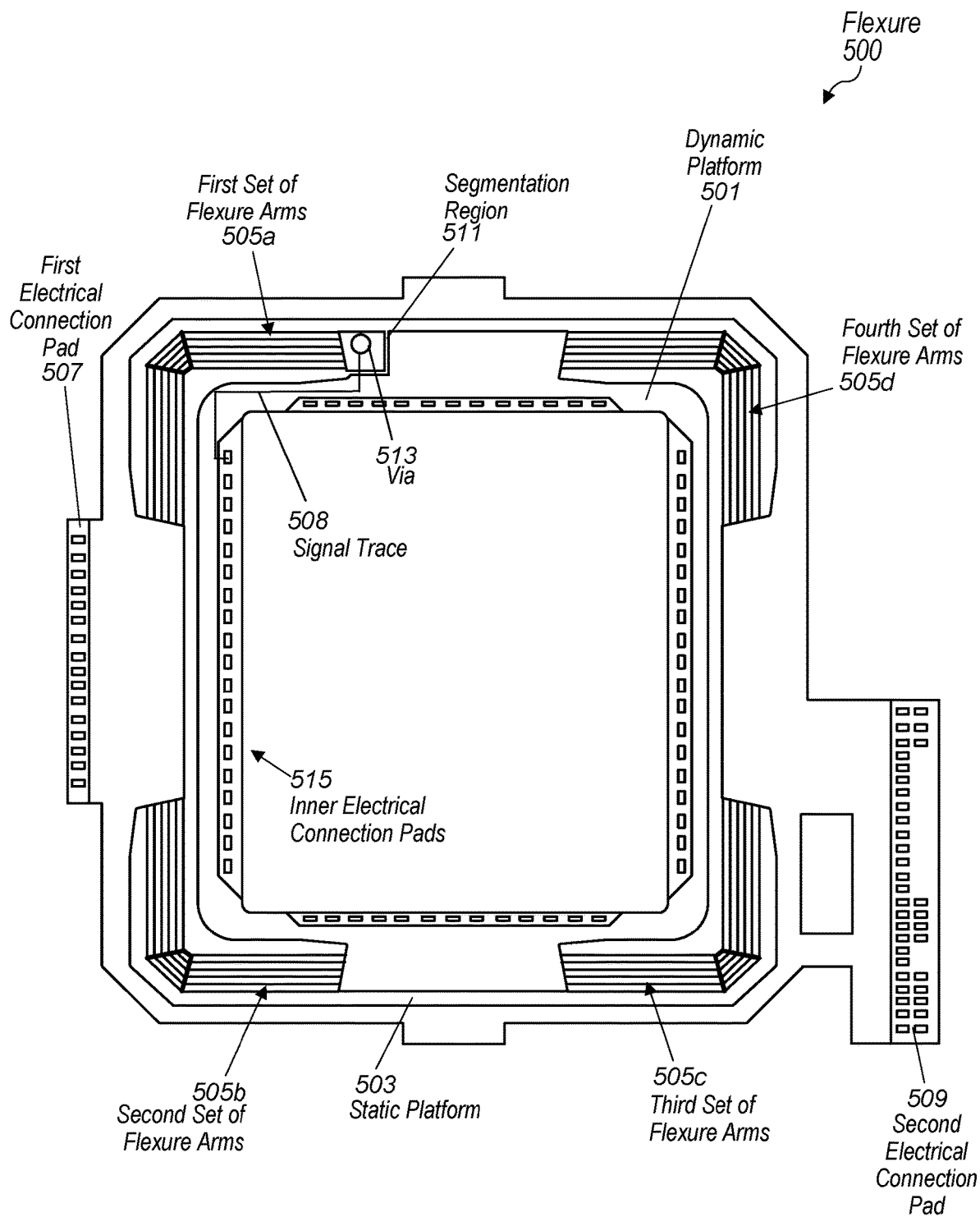
FIG. 5 illustrates an overhead view of an example flexure with a single segmentation region segmenting an electrical communication layer, in accordance with some embodiments.

FIG. 5 illustrates an overhead view of an example flexure 500 with a single segmentation region segmenting an electrical communication layer, in accordance with some embodiments. The flexure 500 may be combined with and/or include one or more same or similar features as the features described with respect to or illustrated in FIGS. 1, 2, 3, 4A, 4B, 6A, 6B, 7, 8, 9, 10, 11, 12, 13, 14A, 14B, 14C, 14D, 15, and 16. As shown in FIG. 5, the flexure 500 includes a dynamic platform 501, a static platform 503, a plurality of sets of flexure arms including a first set of flexure arms 505a, a second set of flexure arms 505b, a third set of flexure arms 505c, and a fourth set of flexure arms 505d, a first set of electrical connection pads 507, a second set of electrical connection pads 509, and a set of inner electrical connection pads 515. In some aspect, the sets of flexure arms 505a-d may define quadrants of the flexure 500 such that the first set of flexure arms 505a is in a first quadrant, the second set of flexure arms 505b is in a second quadrant, the third set of flexure arms 505c is in a third quadrant, and the fourth set of flexure arms 505d is a fourth quadrant. The dynamic platform 501 may include one or more same or similar features as the dynamic platform 221 illustrated in FIG. 4A. The static platform 503 may include one or more same or similar features as the static platform 215 illustrated in FIG. 4A. The flexure arms 505a-d may include one or more same or similar features as the flexure arms 224 illustrated in FIG. 4A. As described herein, the flexure arms 505a-d may include electrical traces having one or more same or similar features as the electrical traces 416 illustrated in FIG. 4A. For example, the electrical traces may be used to provide electronic communication between the static platform 503 and the dynamic platform 501. The first set of electrical connection pads 507 and/or the second set of electrical connection pads 509 may be used to connect the flexure 500 (e.g., and an image sensor in electronic communication with the flexure 500, one or more electronic components in electronic communication with the flexure 500) and one or more other electronic systems of a camera. The set of inner electrical connection pads 515 may be used to connect one or more electrical components (e.g., an AF driver) on a substrate (attached to the dynamic platform 501) and/or an image sensor to the flexure. A signal trace 508 may be used to provided a direct and/or isolated electrical path from a signal pad at the inner electrical connection pads 515 to the via 513, described further herein.

In some aspects, a flexure may include one or more segmentation regions. For example, as shown in FIG. 5, the flexure 500 may include a segmentation region 511. As described herein, the segmentation region 511 may divide a second conductive layer (e.g., a base layer) below a first conductive layer (e.g., a routing layer) into an isolated portion of the second conductive layer and a remaining portion of the second conductive layer so that the isolated portion of the second conductive layer may communicate a ground reference signal originating from a first electrical component in isolation through at least a portion of the flexure 500. For example, as shown in FIG. 5, the segmentation region 511 may form an isolated portion of the second conductive layer through the first set of flexure arms 505a. In some aspects, the segmentation region 511 may also form a remaining portion of the second conductive layer (e.g., isolated from the isolated portion) for communicating another signal (e.g., another ground reference signal) originating from another electrical component attached to the dynamic platform 501. For example, as shown in FIG. 5, the segmentation region 511 may form a remaining portion of the second conductive layer through one or more of the second set of flexure arms 505b, the third set of flexure arms 505c, or the third set of flexure arms 505d.

The set of inner electrical connection pads 515 may be within a same plane as and in electrical communication with the first conductive layer of the flexure 500. Further, as described herein, the first conductive layer may be separated from the second conductive layer by an insulation layer. Thus, when a ground reference signal is returned from an electrical component in communication with the dynamic portion 501 of the flexure 500, the ground reference signal may not be able to communicate from one or more of the inner electrical pads and to the second conductive layer. To communicate the ground reference signal from the one or more inner electrical connection pads 515 to the second conductive layer, a via may provide electrical communication from the inner electrical connection pads 515 and/or the first conductive layer and to the second conductive layer. As shown in FIG. 5, a via 513 may be positioned adjacent (in the vertical direction) the segmentation region 511 and over the isolated portion of the second conductive layer to provide electrical communication of a ground reference signal from the first conductive layer and/or one or more inner electrical connection pads to the isolated portion of the second conductive layer.

Figure 6A:
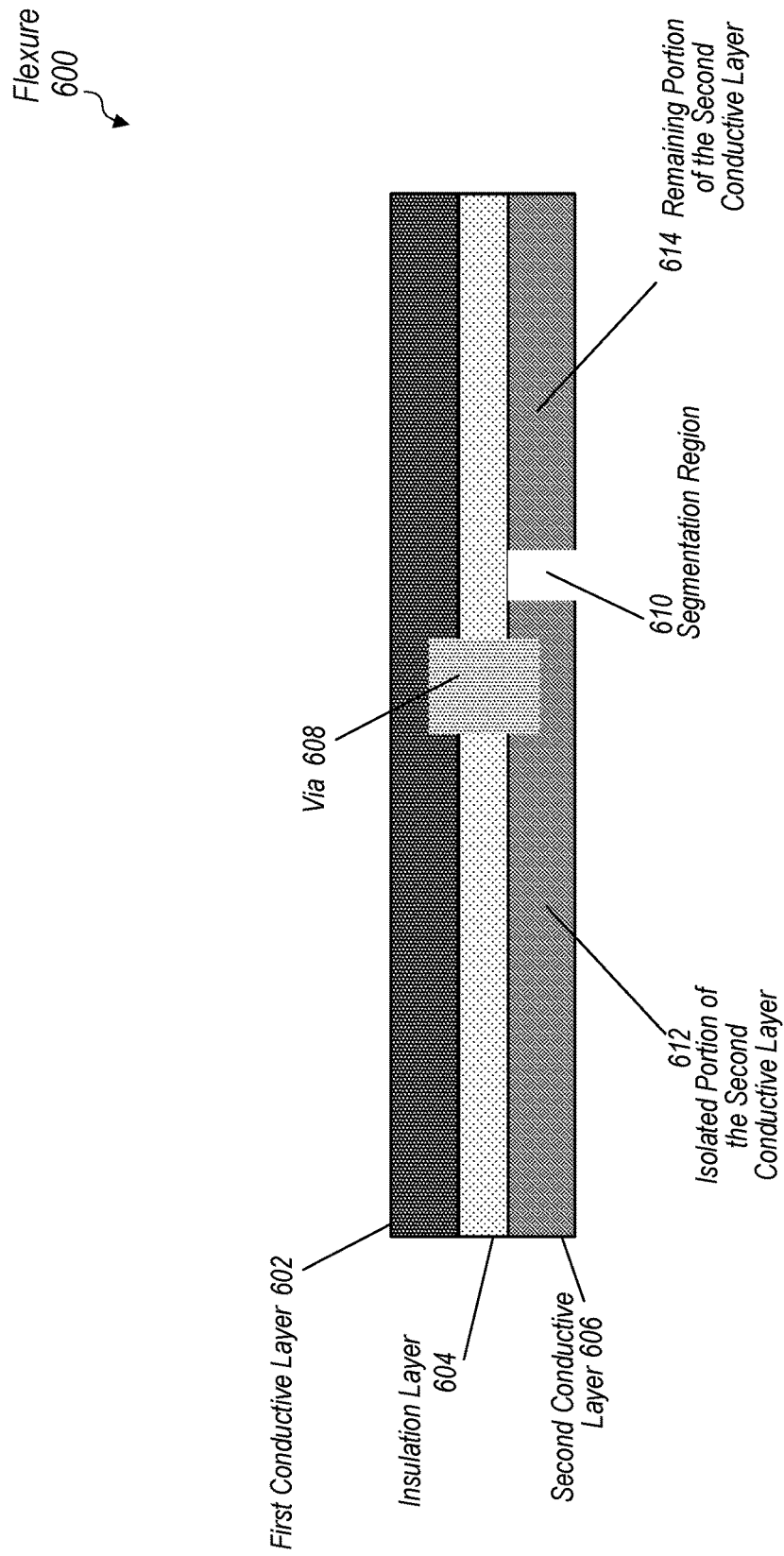
FIG. 6A illustrates a cross-sectional view of an example flexure with a segmentation region, in accordance with some embodiments.

FIG. 6A illustrates a cross-sectional view of an example flexure 600 with a segmentation region, in accordance with some embodiments. The flexure 600 may be combined with and/or include one or more same or similar features as the features described with respect to or illustrated in FIGS. 1, 2, 3, 4A, 4B, 5, 6B, 7, 8, 9, 10, 11, 12, 13, 14A, 14B, 14C, 14D, 15, and 16. As shown in FIG. 6A, the flexure 600 includes a first conductive layer 602, an insulation layer 604, and a second conductive layer 606. The insulation layer 604 may be positioned (e.g., stacked) on the second conductive layer 606 and the first conductive layer 602 may be positioned (e.g., stacked) on the insulation layer 604. In some aspects, the first conductive layer 602 may be a routing layer, the insulation layer 604 may be a polyimide (PI) layer, and the second conductive layer 606 may be a base layer.

The flexure 600 may also include a segmentation region 610. The segmentation region 610 may be the same as or at least similar to the segmentation region 511 illustrated in FIG. 5. The segmentation region 610 may separate (e.g., divide, isolate) a first portion of the second conductive layer 606 from one or more other portions of the second conductive layer 606. As shown in FIG. 6A, the segmentation region 610 may extend vertically through at least a height (e.g., a vertical thickness) of the second conductive layer 606 and may form a gap or a buffer between the isolated portion of the second conductive layer 612 and the remaining portion of the second conductive layer 614. The segmentation region 610 may be used to prevent and/or reduce electrical communication between the isolated portion of the second conductive layer 612 and the remaining portion of the second conductive layer 614 thereby electrically isolating the isolated portion of the second conductive layer 612 and a ground reference signal communicating therethrough from the remaining portion of the second conductive layer 614 and another signal (e.g., another ground reference signal) communicating therethrough. In some aspects, the segmentation region 610 may include an open space forming a gap between the isolated portion of the second conductive layer 612 and the remaining portion of the second conductive layer 614. Additionally, or alternatively, the segmentation region 610 may include a material separating the isolated portion of the second conductive layer 612 from the remaining portion of the second conductive layer 614. In some aspects, the material of the segmentation region 610 may include an insulating material (e.g., polyimide).

In addition, the flexure 600 may include a via 608. The via 608 may be the same as or at least similar to the via 513 illustrated in FIG. 5. The via 608 may extend from the first conductive layer 602 to the second conductive layer 606 to provide electrical communication between the first conductive layer 602 and the second conductive layer 606. As shown in FIG. 6A, the via 608 may extend from the first conductive layer 608 through at least the insulation layer 604 and to (e.g., into, through) the second conductive layer 606. Further, the via 608 may be positioned or configured so that the via 608 extends from the first conductive layer 602 to the isolated portion of the second conductive layer 612. As shown in FIG. 6A, the via 608 may be vertically adjacent to the segmentation region 610 and vertically aligned with the isolated portion of the second conductive layer 612 so that the via 608 extends from the first conductive layer 602 to the isolated portion of the second conductive layer 612. The position and/or the configuration of the via 608 may provide an electrical communication path from the first conductive layer 602 to the isolated portion of the second conductive layer 612 while preventing the electrical communication path from providing electrical communication between the first conductive layer 602 and the remaining portion of the second conductive layer 614 and/or while preventing the electrical communication path from providing electrical communication between the isolated portion of the second communication layer 612 and the remaining portion of the second conductive layer 614.

Figure 6B:
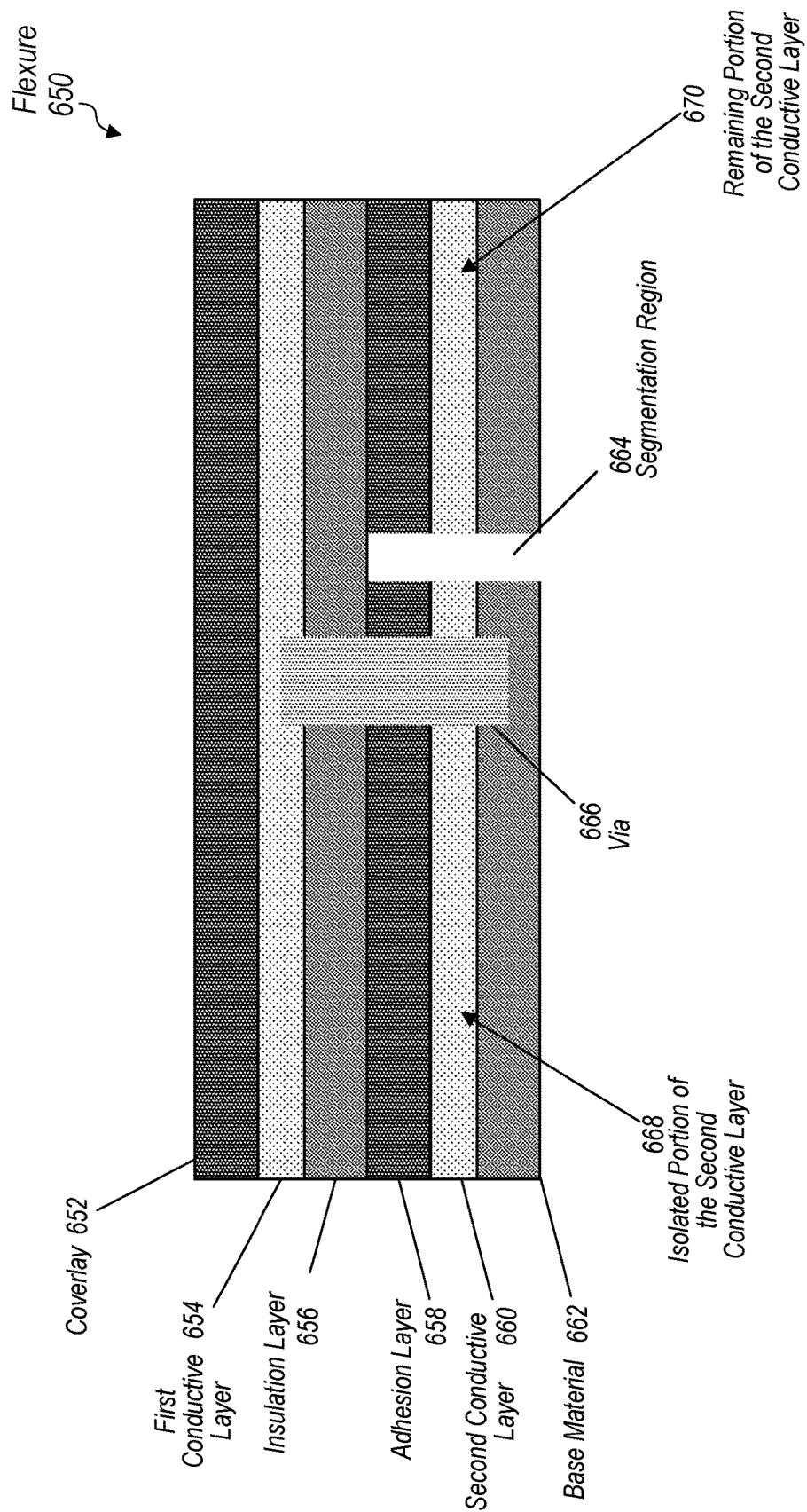
FIG. 6B illustrates a cross-sectional view of an example flexure with a segmentation region, in accordance with some embodiments.

FIG. 6B illustrates a cross-sectional view of an example flexure 650 with a segmentation region, in accordance with some embodiments. The flexure 650 may be combined with and/or include one or more same or similar features as the features described with respect to or illustrated in FIGS. 1, 2, 3, 4A, 4B, 5, 6A, 7, 8, 9, 10, 11, 12, 13, 14A, 14B, 14C, 14D, 15, and 16. As shown in FIG. 6B, the flexure 650 includes a coverlay 652, a first conductive layer 654, an insulation layer 656, an adhesion layer 658, a second conductive layer 660, and a base layer 662. The coverlay 652 may be positioned (e.g., in a stack configuration) over (e.g., abutting) the first conductive layer 654. The first conductive layer 654 may be positioned (e.g., in a stack configuration) over the insulation layer 656. The insulation layer 656 may be positioned (e.g., in a stack configuration) over the adhesion layer 658. The adhesion layer 658 may be positioned (e.g., in a stack configuration) over the second conductive layer 660. The second conductive layer 660 may be positioned (e.g., in a stack configuration) over the base material 662. In some aspect, the first conductive layer 654 may be the same as or at least similar to the first conductive layer 602 illustrated in FIG. 6A. In some aspects, the first conductive layer 654 may include plated copper. In some aspect, the second conductive layer 660 may be the same as or at least similar to the second conductive layer 606 illustrated in FIG. 6A. In some aspects, the second conductive layer 660 may include plated copper. In some aspects, the first conductive layer 654 may be a routing layer, the insulation layer 656 may be a polyimide (PI) layer, and the base material 662 may be a portion of the second conductive layer 660.

The flexure 650 may also include a segmentation region 664. The segmentation region 686 may be the same as or at least similar to the segmentation region 511 illustrated in FIG. 5 and/or the segmentation region 610 illustrated in FIG. 6A. The segmentation region 664 may separate (e.g., divide, isolate) a first portion of the second conductive layer 606 (e.g., and the adhesion layer 658 and/or the base material 662) from one or more other portions of the second conductive layer 606 (e.g., and the adhesion layer 658 and/or the base material 662). As shown in FIG. 6B, the segmentation region 664 may extend vertically through at least a height (e.g., a vertical thickness) of the second conductive layer 606 (e.g., and the adhesion layer 658 and/or the base material 662) and may form a gap or a buffer between the isolated portion of the second conductive layer 668 and the remaining portion of the second conductive layer 670. The segmentation region 664 may be used to prevent and/or reduce electrical communication between the isolated portion of the second conductive layer 668 and the remaining portion of the second conductive layer 670 thereby electrically isolating the isolated portion of the second conductive layer 668 and a ground reference signal communicating therethrough from the remaining portion of the second conductive layer 670 and another signal (e.g., another ground reference signal) communicating therethrough. In some aspects, the segmentation region 664 may include an open space forming a gap between the isolated portion of the second conductive layer 668 and the remaining portion of the second conductive layer 670. Additionally, or alternatively, the segmentation region 664 may include a material separating the isolated portion of the second conductive layer 668 from the remaining portion of the second conductive layer 670. In some aspects, the material of the segmentation region 664 may include an insulating material (e.g., polyimide).

In addition, the flexure 650 may include a via 666. The via 608 may be the same as or at least similar to the via 513 illustrated in FIG. 5 and/or the via 608 illustrated in FIG. 6A. The via 666 may extend from the first conductive layer 654 to the second conductive layer 660 to provide electrical communication between the first conductive layer 654 and the second conductive layer 660. As shown in FIG. 6B, the via 608 may extend from the first conductive layer 654 through at least the insulation layer 656, the adhesion layer 658, and to (e.g., into, through) the second conductive layer 660. In some aspects, the via 666 may extend through the second conductive layer 660 and to the base material 662. Further, the via 666 may be positioned or configured so that the via 666 extends from the first conductive layer 654 to the isolated portion of the second conductive layer 668. As shown in FIG. 6B, the via 666 may be vertically adjacent to the segmentation region 664 and vertically aligned with the isolated portion of the second conductive layer 668 so that the via 666 extends from the first conductive layer 654 to the isolated portion of the second conductive layer 668. The position and/or the configuration of the via 666 may provide an electrical communication path from the first conductive layer 654 to the isolated portion of the second conductive layer 668 while preventing the electrical communication path from providing electrical communication between the first conductive layer 654 and the remaining portion of the second conductive layer 670 and/or while preventing the electrical communication path from providing electrical communication between the isolated portion of the second communication layer 668 and the remaining portion of the second conductive layer 670.

Figure 7:
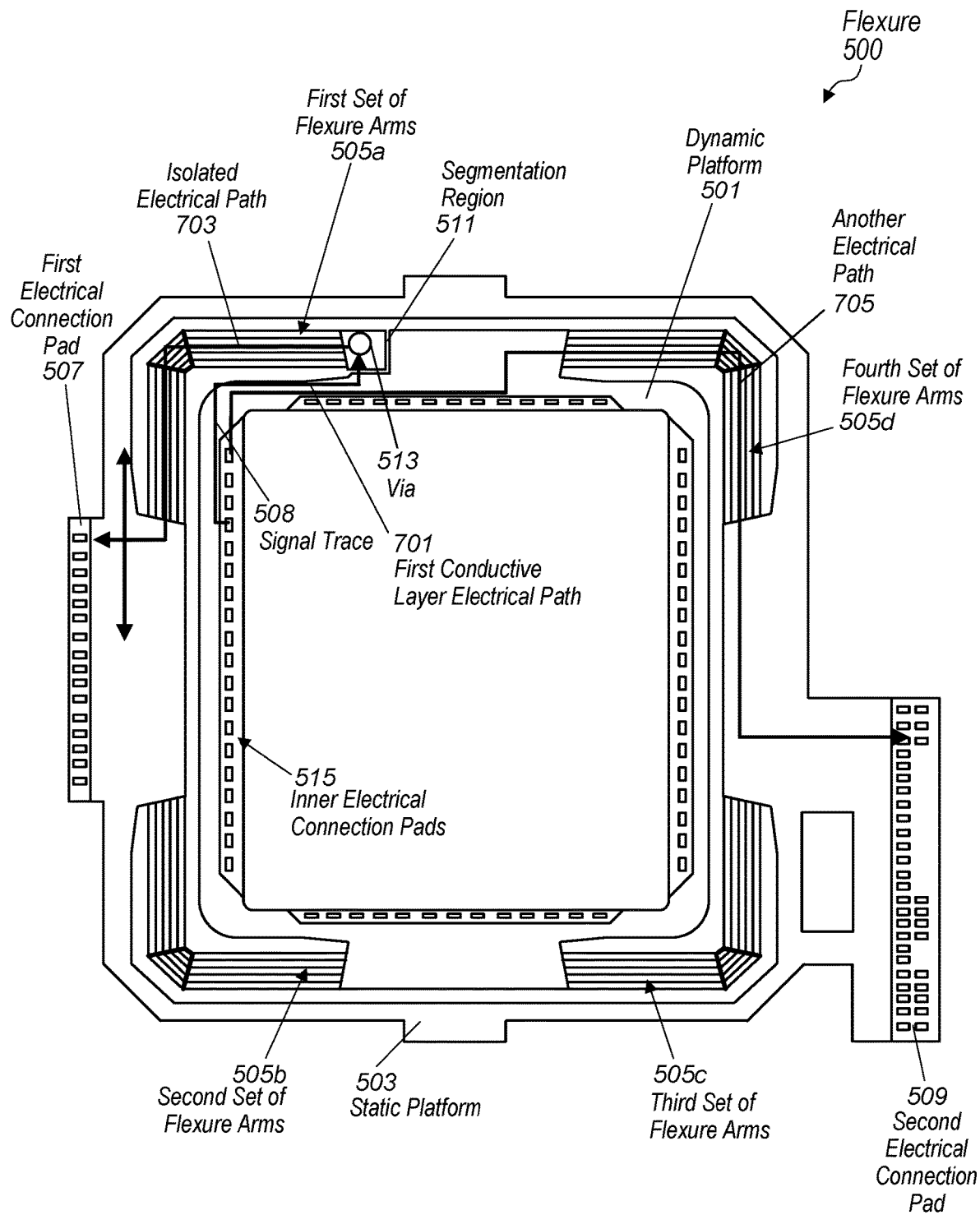
FIG. 7 illustrates an overhead view of an example flexure with a single segmentation region segmenting an electrical communication layer, in accordance with some embodiments.

FIG. 7 illustrates an overhead view of an example flexure 700 with a single segmentation region segmenting an electrical communication layer, in accordance with some embodiments. The flexure 700 may be combined with and/or include one or more same or similar features as the features described with respect to or illustrated in FIGS. 1, 2, 3, 4A, 4B, 5, 6A, 6B, 8, 9, 10, 11, 12, 13, 14A, 14B, 14C, 14D, 15, and 16. As shown in FIG. 7, the flexure 700 includes the dynamic platform 501, the static platform 503, the plurality of sets of flexure arms including the first set of flexure arms 505a, the second set of flexure arms 505b, the third set of flexure arms 505c, and the fourth set of flexure arms 505d, a first set of electrical connection pads 507, a second set of electrical connection pads 509, and a set of inner electrical connection pads 515. In some aspect, the sets of flexure arms 505a-d may define quadrants of the flexure 700 such that the first set of flexure arms 505a is in a first quadrant, the second set of flexure arms 505b is in a second quadrant, the third set of flexure arms 505c is in a third quadrant, and the fourth set of flexure arms 505d is a fourth quadrant. The dynamic platform 501 may include one or more same or similar features as the dynamic platform 220 illustrated in FIG. 4. The static platform 503 may include one or more same or similar features as the static platform 215 illustrated in FIG.

4. The flexure arms 505a-d may include one or more same or similar features as the flexure arms 224 illustrated in FIG. 4. As described herein, the flexure arms 505a-d may include electrical traces having one or more same or similar features as the electrical traces 416 illustrated in FIG. 4. For example, the electrical traces may be used to provide electronic communication between the static platform 503 and the dynamic platform 501. The first set of electrical connection pads 507 and/or the second set of electrical connection pads 509 may be used to connect the flexure 700 (e.g., and an image sensor in electronic communication with the flexure 700, one or more electronic components in electronic communication with the flexure 700) and one or more other electronic systems of a camera. The set of inner electrical connection pads 515 may be used to connect one or more electrical components (e.g., an AF driver) on a substrate (attached to the dynamic platform 501) and/or an image sensor to the 700 flexure.

In some aspects, a flexure may include one or more segmentation regions. For example, as shown in FIG. 7, the flexure 700 may include the segmentation region 511. The segmentation region 511 may be same as or at least similar to the segmentation region 610 illustrated in FIG. 6A and/or the segmentation region 664 illustrated in FIG. 6B. As described herein, the segmentation region 511 may divide a second conductive layer (e.g., below a first conductive layer) into an isolated portion of the second conductive layer (e.g., isolated portion of the second conductive layer 612 of FIG. 6A, isolated portion of the second conductive layer 668 of FIG. 6B) and a remaining portion of the second conductive layer (e.g., remaining portion of the second conductive layer 614 of FIG. 6A, remaining portion of the second conductive layer 670 of FIG. 6B) so that the isolated portion of the second conductive layer may communicate a ground reference signal originating from a first electrical component in isolation (e.g., electrical isolation, physical isolation) through at least a portion of the flexure 700. In some aspects, the segmentation region 511 may form an isolated electrical path 703 and another electrical path 705 through the second conductive layer. For example, the isolated electrical path 703 may provide electrical communication through the isolated portion of the second conductive layer formed by the segmentation region 511 and the other electrical path 705 may provide electrical communication through the remaining portion of the second conductive layer.

As shown in FIG. 7, a first conductive layer electrical path 701 (e.g., formed by the signal trace 508) may receive a signal (e.g., a ground reference signal) from one or more pads of the inner electrical connection pads 515. The first conductive layer electrical path 701 extending through the first conductive layer of the dynamic platform 501 and to the via 511, may communicate the signal from the pads of the inner electrical connection pads 515 and to the via 511. The via 511 may carry the signal from the first conductive layer electrical path 701 of the first conductive layer to the isolated electrical path 703 of the second conductive layer. The isolated electrical path 703 may provide electrical communication through the isolated portion of the second conductive layer formed by the segmentation region 511 and through at least the first set of flexure arms 505a while the other electrical path 705 may provide electrical communication through the remaining portion of the second conductive layer and one or more other sets of flexure arms. Further, once the isolated electrical path 703 reaches the static platform 503, the isolated electrical path 703 may no longer be isolated from other electrical paths (and other electrical signals (e.g., other ground reference signal)) through the second conductive layer. The ground reference signal may then communicate through any one or more of the quadrants on the static platform to reach at least one of the first electrical connection pads 507 and/or the second electrical connection pads 509. With this configuration, the segmentation region 511 may mitigate at least some cross-coupling between a ground reference signal communicating through the isolated electrical path 703 and another signal (e.g., another ground reference signal) communicating through the other electrical path 705.

Figure 8:
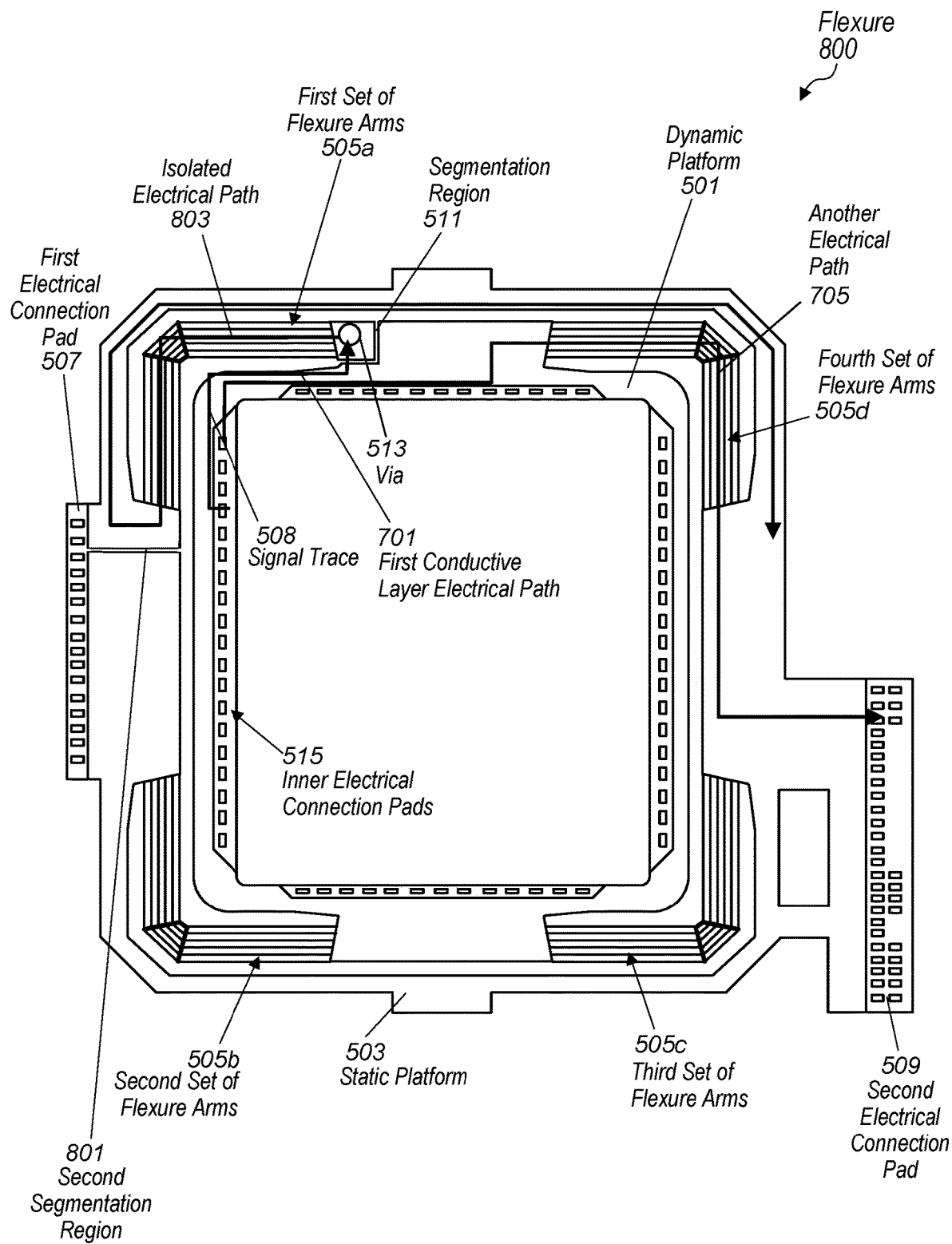
FIG. 8 illustrates an overhead view of an example flexure with multiple segmentation regions segmenting an electrical communication layer, in accordance with some embodiments.

FIG. 8 illustrates an overhead view of an example flexure 800 with multiple segmentation regions segmenting an electrical communication layer, in accordance with some embodiments. The flexure 800 may be combined with and/or include one or more same or similar features as the features described with respect to or illustrated in FIGS. 1, 2, 3, 4A, 4B, 5, 6A, 6B, 7, 9, 10, 11, 12, 13, 14A, 14B, 14C, 14D, 15, and 16. As shown in FIG. 8, the flexure 800 includes the dynamic platform 501, the static platform 503, the plurality of sets of flexure arms including the first set of flexure arms 505a, the second set of flexure arms 505b, the third set of flexure arms 505c, and the fourth set of flexure arms 505d, the first set of electrical connection pads 507, the second set of electrical connection pads 509, and the set of inner electrical connection pads 515.

In some aspects, a flexure may include one or more segmentation regions. For example, as shown in FIG. 8, the flexure 800 may include the segmentation region 511 (hereinafter the "first segmentation region 511") and a second segmentation region 801. The first segmentation region 511 and the second segmentation region 801 may be same as or at least similar to the segmentation region 610 illustrated in FIG. 6A and/or the segmentation region 664 illustrated in FIG. 6B. As described herein, the first segmentation region 511 and the second segmentation region 801 may divide a second conductive layer (e.g., below a first conductive layer) into an isolated portion of the second conductive layer (e.g., isolated portion of the second conductive layer 612 of FIG. 6A, isolated portion of the second conductive layer 668 of FIG. 6B) and a remaining portion of the second conductive layer (e.g., remaining portion of the second conductive layer 614 of FIG. 6A, remaining portion of the second conductive layer 670 of FIG. 6B) so that the isolated portion of the second conductive layer may communicate a ground reference signal originating from a first electrical component in isolation (e.g., electrical isolation, physical isolation) through at least a portion of the flexure 800. In some aspects, the first segmentation region 511 and the second segmentation region 801 may form an isolated electrical path 803 and another electrical path 705 through the second conductive layer. For example, the isolated electrical path 803 may provide electrical communication through the isolated portion of the second conductive layer formed by the first segmentation region 511 and the second segmentation region 801 while the other electrical path 705 may provide electrical communication through the remaining portion of the second conductive layer.

As shown in FIG. 8, a first conductive layer electrical path 701 (e.g., formed by the signal trace 508) may receive a signal (e.g., a ground reference signal) from one or more pads of the inner electrical connection pads 515. The first conductive layer electrical path 701 extending through the first conductive layer of the dynamic platform 501 and to the via 511, may communicate the signal from the pads of the inner electrical connection pads 515 and to the via 511. The via 511 may carry the signal from the first conductive layer electrical path 701 of the first conductive layer to the isolated electrical path 803 of the second conductive layer. The isolated electrical path 803 may provide electrical communication through the isolated portion of the second conductive layer formed by the first segmentation region 511 and the second segmentation region 801, through at least the first set of flexure arms 505a and across the static flexure 503 through the quadrant including the fourth set of flexure arms 505d while the other electrical path 705 may provide electrical communication through the remaining portion of the second conductive layer and one or more other sets of flexure arms. Further, once the isolated electrical path 803 reaches the area on the static platform 503 where the fourth set of flexure arms 505d meets the static platform 503, the isolated electrical path 803 may no longer be isolated from other electrical paths (and other electrical signals (e.g., other ground reference signal)) through the second conductive layer. The ground reference signal may then communicate through the static platform 503 to reach at least one of the first electrical connection pads 507 and/or the second electrical connection pads 509. With this configuration, the first segmentation region 511 and the second segmentation region 801 may mitigate at least some cross-coupling between a ground reference signal communicating through the isolated electrical path 803 and another signal (e.g., another ground reference signal) communicating through the other electrical path 705.

As described herein, with multiple component systems, one or more of the components (e.g., an image sensor, AF drivers, OIS drivers) may utilize separate and/or isolated electrical communication paths to communicate ground reference signals in order to mitigate cross-coupling between ground reference signals. For example, a ground reference signal from an AF driver that is not separate and/or isolated (e.g., electrically) from a ground reference signal from an image sensor may reduce the image quality of an image captured by the image sensor due to cross-coupling between the ground reference signals. In addition, the longer the distance that electrical communication paths are separated and/or isolated from each other, the less frequent cross-coupling between ground reference signals may occur. Thus, for example, when a ground reference signal from an AF driver is separated from and/or isolated from a ground reference signal from an image sensor for a short distance (e.g., relative to the total distance of the electrical communication path), cross-coupling between ground reference signals may occur more often compared to when the ground reference signal form the AF drive is separated from and/or isolated from the ground reference signal from an image sensor for a longer distance (e.g., relative to the total distance of the electrical communication path). As another example, because the isolated electrical path 803 illustrated in FIG. 8 is isolated for a greater distance than the isolated electrical path 703 illustrated in FIG. 7, cross-coupling between ground reference signals may occur less often on isolated electrical path 803 compared to the isolated electrical path 703. Accordingly, the longer an electrical communication path separates and/or isolates a ground reference signal from another electrical communication path carrying another signal (e.g., another ground reference signal), the less likely cross-coupling may occur between signals.

Figure 9:
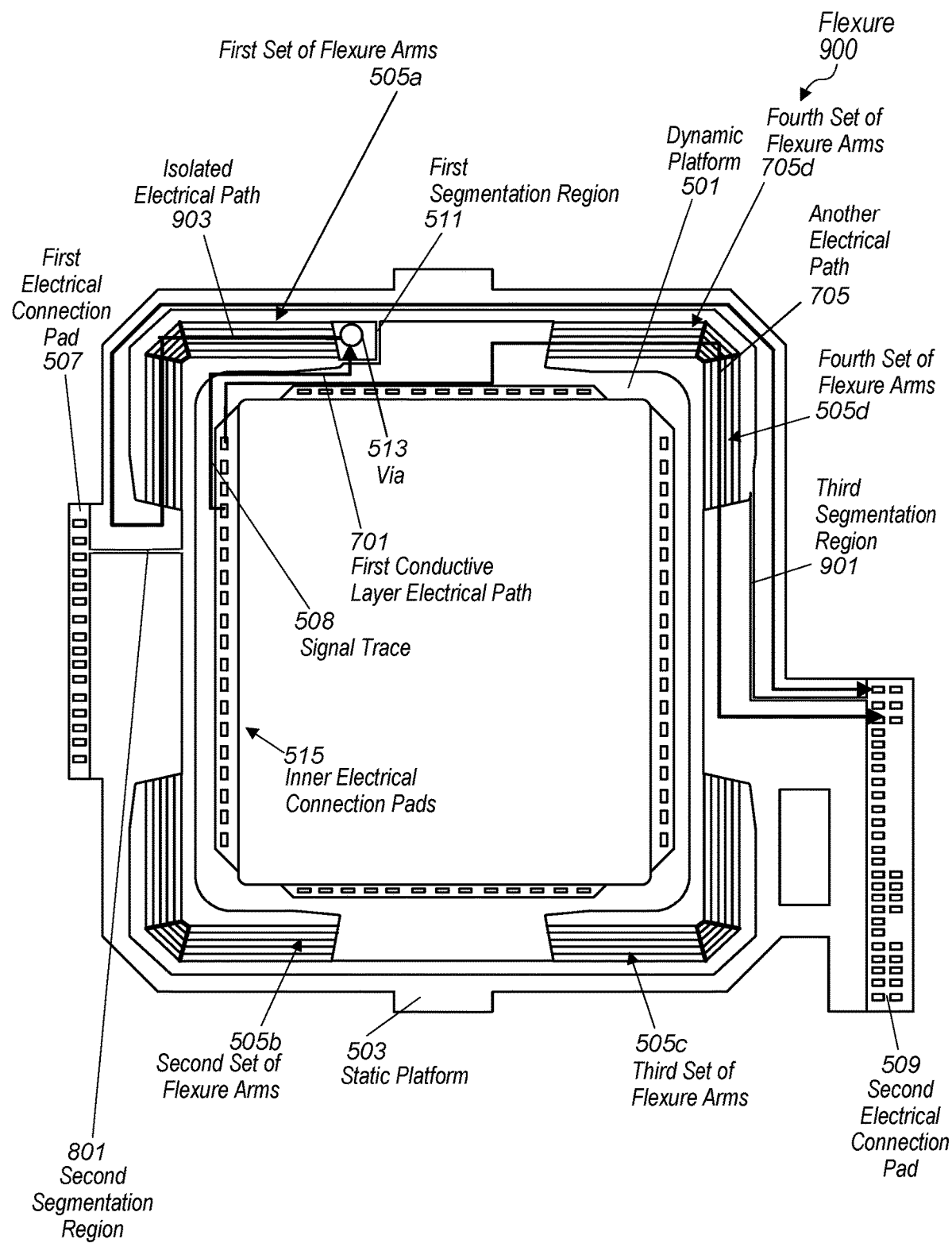
FIG. 9 illustrates an overhead view of another example flexure with multiple segmentation regions segmenting an electrical communication layer, in accordance with some embodiments.

FIG. 9 illustrates an overhead view of another example flexure with multiple segmentation regions segmenting an electrical communication layer, in accordance with some embodiments. The flexure 900 may be combined with and/or include one or more same or similar features as the features described with respect to or illustrated in FIGS. 1, 2, 3, 4A, 4B, 5, 6A, 6B, 7, 8, 10, 11, 12, 13, 14A, 14B, 14C, 14D, 15, and 16. As shown in FIG. 9, the flexure 900 includes the dynamic platform 501, the static platform 503, the plurality of sets of flexure arms including the first set of flexure arms 505a, the second set of flexure arms 505b, the third set of flexure arms 505c, and the fourth set of flexure arms 505d, the first set of electrical connection pads 507, the second set of electrical connection pads 509, and the set of inner electrical connection pads 515.

In some aspects, a flexure may include one or more segmentation regions. For example, as shown in FIG. 9, the flexure 900 may include the first segmentation region 511, the second segmentation region 801, and third segmentation region 901. The first segmentation region 511, the second segmentation region 801, and the third segmentation region 901 may be same as or at least similar to the segmentation region 610 illustrated in FIG. 6A and/or the segmentation region 664 illustrated in FIG. 6B. As described herein, the first segmentation region 511, the second segmentation region 801, and the third segmentation region 901 may divide a second conductive layer (e.g., below a first conductive layer) into an isolated portion of the second conductive layer (e.g., isolated portion of the second conductive layer 612 of FIG. 6A, isolated portion of the second conductive layer 668 of FIG. 6B) and a remaining portion of the second conductive layer (e.g., remaining portion of the second conductive layer 614 of FIG. 6A, remaining portion of the second conductive layer 670 of FIG. 6B) so that the isolated portion of the second conductive layer may communicate a ground reference signal originating from a first electrical component in isolation (e.g., electrical isolation, physical isolation) through at least a portion of the flexure 900. In some aspects, the first segmentation region 511, the second segmentation region 801, and the third segmentation region 901 may form an isolated electrical path 903 and another electrical path 705 through the second conductive layer. For example, the isolated electrical path 903 may provide electrical communication through the isolated portion of the second conductive layer formed by the first segmentation region 511, the second segmentation region 801, and the third segmentation region 901 while the other electrical path 705 may provide electrical communication through the remaining portion of the second conductive layer.

As shown in FIG. 9, a first conductive layer electrical path 701 (e.g., formed by the signal trace 508) may receive a signal (e.g., a ground reference signal) from one or more pads of the inner electrical connection pads 515. The first conductive layer electrical path 701 extending through the first conductive layer of the dynamic platform 501 and to the via 511, may communicate the signal from the pads of the inner electrical connection pads 515 and to the via 511. The via 511 may carry the signal from the first conductive layer electrical path 701 of the first conductive layer to the isolated electrical path 903 of the second conductive layer. The isolated electrical path 903 may provide electrical communication through the isolated portion of the second conductive layer formed by the first segmentation region 511, the second segmentation region 801, the third segmentation region 901, through the first set of flexure arms 505a, across the static flexure 503 and to one or more pads of the second electrical connection pads 509 while the other electrical path 705 may provide electrical communication through the remaining portion of the second conductive layer and one or more other sets of flexure arms. In this case, a ground reference signal communicating through the isolated electrical path 903 may have little cross-coupling with another ground reference signal communicating through the other electrical path 705 because the isolated electrical path 903 remains isolated from the via 511 to the one or more pads of the second electrical connection pads 509. With this configuration, the first segmentation region 511, the second segmentation region 801, and the third segmentation region 901 may mitigate at least some cross-coupling between a ground reference signal communicating through the isolated electrical path 903 and another signal (e.g., another ground reference signal) communicating through the other electrical path 705.

As described herein, with multiple component systems, one or more of the components (e.g., an image sensor, AF drivers, OIS drivers) may utilize separate and/or isolated electrical communication paths to communicate ground reference signals in order to mitigate cross-coupling between ground reference signals. For example, a ground reference signal from an AF driver that is not separate and/or isolated (e.g., electrically) from a ground reference signal from an image sensor may reduce the image quality of an image captured by the image sensor due to cross-coupling between the ground reference signals. In addition, the longer the distance that electrical communication paths are separated and/or isolated from each other, the less frequent cross-coupling between ground reference signals may occur. Thus, for example, when a ground reference signal from an AF driver is separated from and/or isolated from a ground reference signal from an image sensor for a short distance (e.g., relative to the total distance of the electrical communication path), cross-coupling between ground reference signals may occur more often compared to when the ground reference signal form the AF drive is separated from and/or isolated from the ground reference signal from an image sensor for a longer distance (e.g., relative to the total distance of the electrical communication path). As another example, because the isolated electrical path 903 illustrated in FIG. 9 is isolated for a greater distance than the isolated electrical path 703 illustrated in FIG. 7 and the isolated electrical path 803, cross-coupling between ground reference signals may occur less often on isolated electrical path 903 compared to the isolated electrical path 703 and the isolated electrical path 803. Accordingly, the longer an electrical communication path separates and/or isolates a ground reference signal from another electrical communication path carrying another signal (e.g., another ground reference signal), the less likely cross-coupling may occur between signals.

Figure 10:
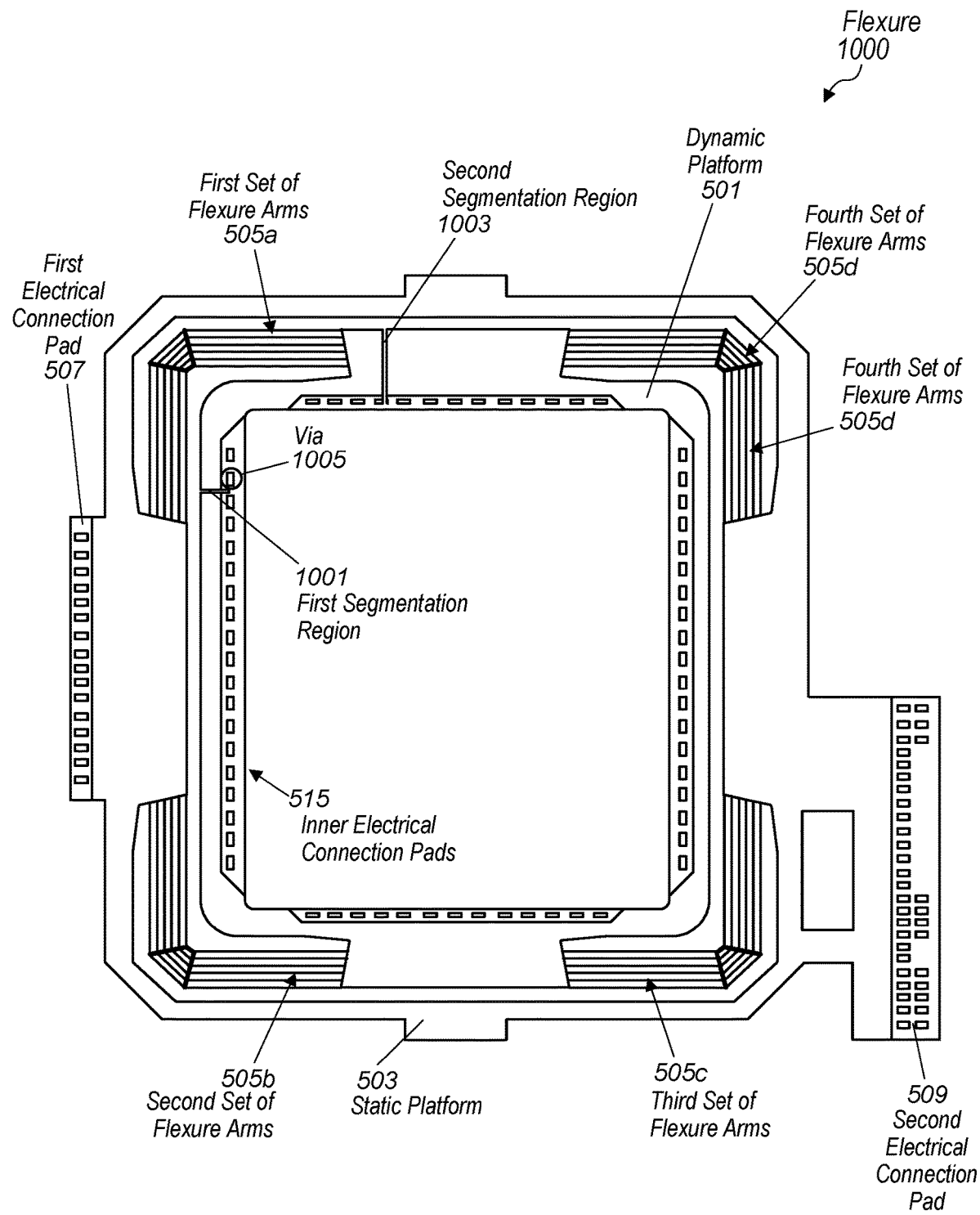
FIG. 10 illustrates an overhead view of an example flexure with a pair of segmentation regions segmenting an electrical communication layer, in accordance with some embodiments.

FIG. 10 illustrates an overhead view of an example flexure with a pair of segmentation regions segmenting an electrical communication layer, in accordance with some embodiments. The flexure 1000 may be combined with and/or include one or more same or similar features as the features described with respect to or illustrated in FIGS. 1, 2, 3, 4A, 4B, 5, 6A, 6B, 7, 8, 9, 11, 12, 13, 14A, 14B, 14C, 14D, 15, and 16. As shown in FIG. 10, the flexure 1000 includes the dynamic platform 501, the static platform 503, the plurality of sets of flexure arms including the first set of flexure arms 505a, the second set of flexure arms 505b, the third set of flexure arms 505c, and the fourth set of flexure arms 505d, the first set of electrical connection pads 507, the second set of electrical connection pads 509, and the set of inner electrical connection pads 515.

In some aspects, as described herein, a flexure may include one or more segmentation regions. For example, as shown in FIG. 10, the flexure 1000 may include a first segmentation region 1001 and a second segmentation region 1003. The first segmentation region 1001 and the second segmentation region 1003 may divide a second conductive layer (e.g., a base layer) below a first conductive layer (e.g., a routing layer) into the isolated portion of the second conductive layer and the remaining portion of the second conductive layer so that the isolated portion of the second conductive layer may communicate a ground reference signal originating from a first electrical component in isolation through at least a portion of the flexure 1000. For example, as shown in FIG. 10, the first segmentation region 1001 and the second segmentation region 1003 may form an isolated portion of the second conductive layer from one or more pads of the inner electrical pads 515 through the dynamic platform 501 and the first set of flexure arms 505a. In some aspects, the first segmentation region 1001 and the second segmentation region 1003 may also form a remaining portion of the second conductive layer (e.g., isolated from the isolated portion) for communicating another signal (e.g., another ground reference signal) originating from another electrical component attached to the dynamic platform 501. For example, as shown in FIG. 10, the first segmentation region 1001 and the second segmentation region 1003 may form a remaining portion of the second conductive layer through one or more of the second set of flexure arms 505b, the third set of flexure arms 505c, or the third set of flexure arms 505d.

The set of inner electrical connection pads 515 may be within a same plane as and in electrical communication with the first conductive layer of the flexure 1000. Further, as described herein, the first conductive layer may be separated from the second conductive layer by an insulation layer. Thus, when a ground reference signal is returned from an electrical component in communication with the dynamic portion 501 of the flexure 1000, the ground reference signal may not be able to communicate from one or more of the inner electrical pads and to the second conductive layer. To communicate the ground reference signal from the one or more inner electrical connection pads 515 to the second conductive layer, a via may provide electrical communication from the inner electrical connection pads 515 and/or the first conductive layer and to the second conductive layer. As shown in FIG. 10, a via 1005 may be positioned adjacent (in the vertical direction) the first segmentation region 1001, beneath one or more pads of the inner electrical connection pads 515, and over the isolated portion of the second conductive layer to provide electrical communication of a ground reference signal from the first conductive layer and/or one or more inner electrical connection pads to the isolated portion of the second conductive layer.

Figure 11:
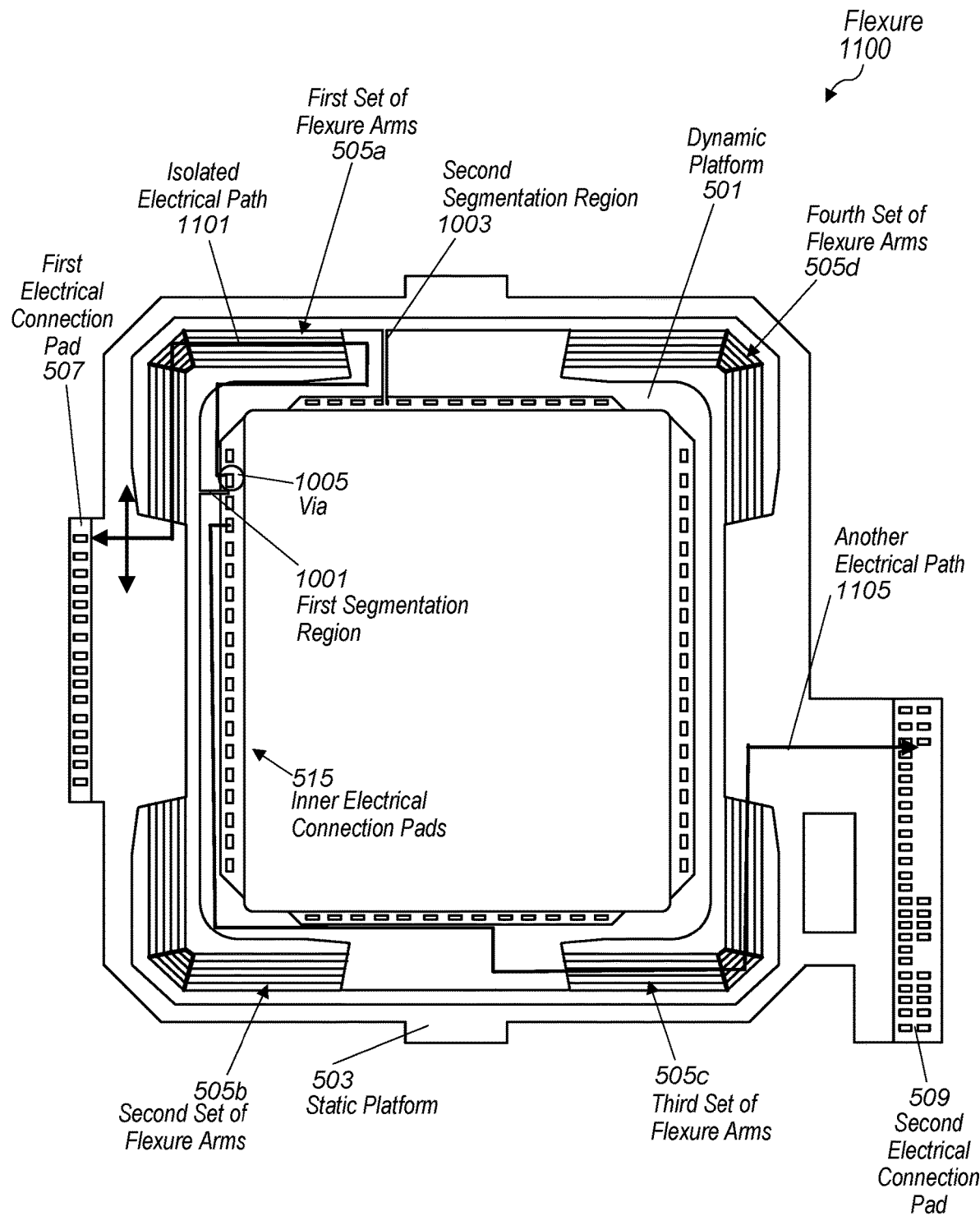
FIG. 11 illustrates an overhead view of an example flexure with a pair of segmentation regions segmenting an electrical communication layer, in accordance with some embodiments.

FIG. 11 illustrates an overhead view of an example flexure with a pair of segmentation regions segmenting an electrical communication layer, in accordance with some embodiments. The flexure 1100 may be combined with and/or include one or more same or similar features as the features described with respect to or illustrated in FIGS. 1, 2, 3, 4A, 4B, 5, 6A, 6B, 7, 8, 9, 10, 12, 13, 14A, 14B, 14C, 14D, 15, and 16. As shown in FIG. 11, the flexure 1100 includes the dynamic platform 501, the static platform 503, the plurality of sets of flexure arms including the first set of flexure arms 505a, the second set of flexure arms 505b, the third set of flexure arms 505c, and the fourth set of flexure arms 505d, the first set of electrical connection pads 507, the second set of electrical connection pads 509, and the set of inner electrical connection pads 515. The first set of electrical connection pads 507 and/or the second set of electrical connection pads 509 may be used to connect the flexure 1100 (e.g., and an image sensor in electronic communication with the flexure 1100, one or more electronic components in electronic communication with the flexure 1100) and one or more other electronic systems of a camera. The set of inner electrical connection pads 515 may be used to connect one or more electrical components (e.g., an AF driver) on a substrate (attached to the dynamic platform 501) and/or an image sensor to the 1100 flexure.

In some aspects, a flexure may include one or more segmentation regions. For example, as shown in FIG. 11, the flexure 1100 may include the first segmentation region 1001 and the second segmentation region 1003. The first segmentation region 1001 and the second segmentation region 1003 may be same as or at least similar to the segmentation region 610 illustrated in FIG. 6A and/or the segmentation region 664 illustrated in FIG. 6B. As described herein, the first segmentation region 1001 and the second segmentation region 1003 may divide a second conductive layer (e.g., below a first conductive layer) into an isolated portion of the second conductive layer (e.g., isolated portion of the second conductive layer 612 of FIG. 6A, isolated portion of the second conductive layer 668 of FIG. 6B) and a remaining portion of the second conductive layer (e.g., remaining portion of the second conductive layer 614 of FIG. 6A, remaining portion of the second conductive layer 670 of FIG. 6B) so that the isolated portion of the second conductive layer may communicate a ground reference signal originating from a first electrical component in isolation (e.g., electrical isolation, physical isolation) through at least a portion of the flexure 1100. In some aspects, the segmentation region 511 may form an isolated electrical path 1101 and another electrical path 1105 through the second conductive layer. For example, the isolated electrical path 1101 may provide electrical communication through the isolated portion of the second conductive layer formed by the first segmentation region 1001 and the second segmentation region 1003 while the other electrical path 1105 may provide electrical communication through the remaining portion of the second conductive layer.

As shown in FIG. 11, an isolated electrical path 1101 may receive a signal (e.g., a ground reference signal) through the via 1005 from one or more pads of the inner electrical connection pads 515. The isolated electrical path 1101 extending through the second conductive layer of the dynamic platform 501 and through the first set of flexure arms 505a, may communicate the signal to the location on the static platform 503 connects with the first set of flexure arms. The isolated electrical path 1101 may provide electrical communication through the isolated portion of the second conductive layer formed by the first segmentation region 1001 and the second segmentation region 1003 and through at least the first set of flexure arms 505a while the other electrical path 1105 may provide electrical communication through the remaining portion of the second conductive layer and one or more other sets of flexure arms. Further, once the isolated electrical path 1101 reaches the static platform 503, the isolated electrical path 1101 may no longer be isolated from other electrical paths (and other electrical signals (e.g., other ground reference signal)) through the second conductive layer. The ground reference signal may then communicate through any one or more of the quadrants on the static platform 503 to reach at least one of the first electrical connection pads 507 and/or the second electrical connection pads 509. With this configuration, the first segmentation region 1001 and the second segmentation region 1003 may mitigate at least some cross-coupling between a ground reference signal communicating through the isolated electrical path 1101 and another signal (e.g., another ground reference signal) communicating through the other electrical path 1105.

Figure 12:
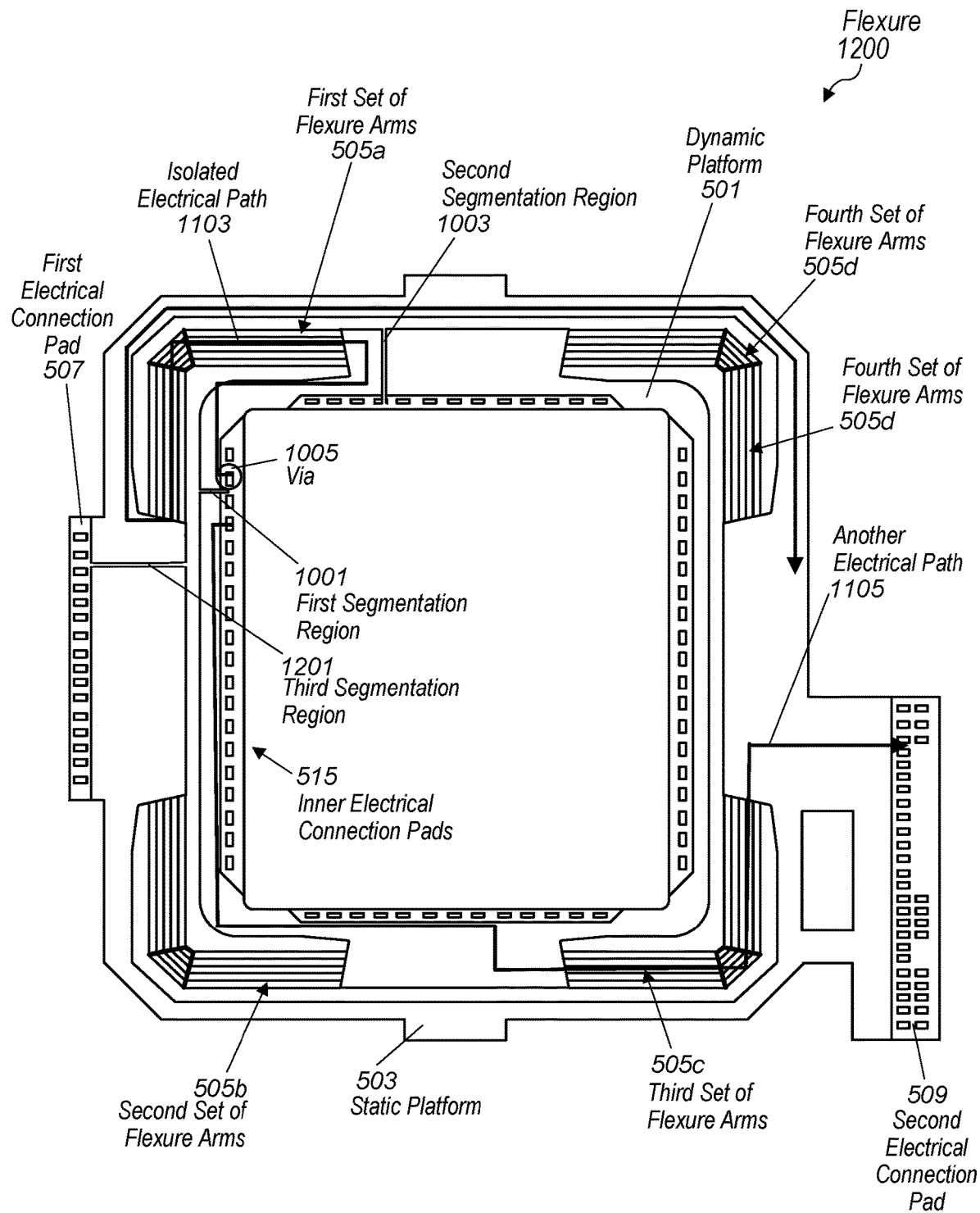
FIG. 12 illustrates an overhead view of an example flexure with multiple segmentation regions segmenting an electrical communication layer, in accordance with some embodiments.

FIG. 12 illustrates an overhead view of an example flexure with multiple segmentation regions segmenting an electrical communication layer, in accordance with some embodiments. The flexure 1200 may be combined with and/or include one or more same or similar features as the features described with respect to or illustrated in FIGS. 1, 2, 3, 4A, 4B, 5, 6A, 6B, 7, 8, 9, 10, 11, 13, 14A, 14B, 14C, 14D, 15, and 16. As shown in FIG. 12, the flexure 1200 includes the dynamic platform 501, the static platform 503, the plurality of sets of flexure arms including the first set of flexure arms 505a, the second set of flexure arms 505b, the third set of flexure arms 505c, and the fourth set of flexure arms 505d, the first set of electrical connection pads 507, the second set of electrical connection pads 509, and the set of inner electrical connection pads 515. The first set of electrical connection pads 507 and/or the second set of electrical connection pads 509 may be used to connect the flexure 1200 (e.g., and an image sensor in electronic communication with the flexure 1200, one or more electronic components in electronic communication with the flexure 1200) and one or more other electronic systems of a camera. The set of inner electrical connection pads 515 may be used to connect one or more electrical components (e.g., an AF driver) on a substrate (attached to the dynamic platform 501) and/or an image sensor to the 1200 flexure.

In some aspects, a flexure may include one or more segmentation regions. For example, as shown in FIG. 12, the flexure 1200 may include the first segmentation region 1001, the second segmentation region 1003, and the third segmentation region 1201. The first segmentation region 1001, the second segmentation region 1003, and the third segmentation region 1201 may be same as or at least similar to the segmentation region 610 illustrated in FIG. 6A and/or the segmentation region 664 illustrated in FIG. 6B. As described herein, the first segmentation region 1001, the second segmentation region 1003, and the third segmentation region 1201 may divide a second conductive layer (e.g., below a first conductive layer) into an isolated portion of the second conductive layer (e.g., isolated portion of the second conductive layer 612 of FIG. 6A, isolated portion of the second conductive layer 668 of FIG. 6B) and a remaining portion of the second conductive layer (e.g., remaining portion of the second conductive layer 614 of FIG. 6A, remaining portion of the second conductive layer 670 of FIG. 6B) so that the isolated portion of the second conductive layer may communicate a ground reference signal originating from a first electrical component in isolation (e.g., electrical isolation, physical isolation) through at least a portion of the flexure 1200. In some aspects, the first segmentation region 1001, the second segmentation region 1003, and the third segmentation region 1201 may form an isolated electrical path 1203 and the other electrical path 1105 through the second conductive layer. For example, the isolated electrical path 1203 may provide electrical communication through the isolated portion of the second conductive layer formed by the first segmentation region 1001, the second segmentation region 1003, and the third segmentation region 1201 while the other electrical path 1105 may provide electrical communication through the remaining portion of the second conductive layer.

As shown in FIG. 12, the isolated electrical path 1203 may receive a signal (e.g., a ground reference signal) through the via 1005 from one or more pads of the inner electrical connection pads 515. The isolated electrical path 1203 extending through the second conductive layer of the dynamic platform 501 through the first set of flexure arms 505a, and around the static platform 503 on the isolated portion of the second conductive layer may communicate the signal to the location on the static platform 503 connects with the first set of flexure arms while the other electrical path 1105 may provide electrical communication through the remaining portion of the second conductive layer and one or more other sets of flexure arms. Further, once the isolated electrical path 1101 reaches the location where the static platform 503 connects with the fourth set of flexure arms 505*d*, the isolated electrical path 1203 may no longer be isolated from other electrical paths (and other electrical signals (e.g., other ground reference signal)) through the second conductive layer. The ground reference signal may then communicate through any one or more of the quadrants on the static platform 503 to reach at least one of the first electrical connection pads 507 and/or the second electrical connection pads 509. With this configuration, the first segmentation region 1001, the second segmentation region 1003, and the third segmentation region 1201 may mitigate at least some cross-coupling between a ground reference signal communicating through the isolated electrical path 1203 and another signal (e.g., another ground reference signal) communicating through the other electrical path 1105.

As described herein, with multiple component systems, one or more of the components (e.g., an image sensor, AF drivers, OIS drivers) may utilize separate and/or isolated electrical communication paths to communicate ground reference signals in order to mitigate cross-coupling between ground reference signals. For example, a ground reference signal from an AF driver that is not separate and/or isolated (e.g., electrically) from a ground reference signal from an image sensor may reduce the image quality of an image captured by the image sensor due to cross-coupling between the ground reference signals. In addition, the longer the distance that electrical communication paths are separated and/or isolated from each other, the less frequent cross-coupling between ground reference signals may occur. Thus, for example, when a ground reference signal from an AF driver is separated from and/or isolated from a ground reference signal from an image sensor for a short distance (e.g., relative to the total distance of the electrical communication path), cross-coupling between ground reference signals may occur more often compared to when the ground reference signal form the AF drive is separated from and/or isolated from the ground reference signal from an image sensor for a longer distance (e.g., relative to the total distance of the electrical communication path). As another example, because the isolated electrical path 1203 illustrated in FIG. 12 is isolated for a greater distance than the isolated electrical path 1101 illustrated in FIG. 11, cross-coupling between ground reference signals may occur less often on isolated electrical path 1203 compared to the isolated electrical path 1101. Accordingly, the longer an electrical communication path separates and/or isolates a ground reference signal from another electrical communication path carrying another signal (e.g., another ground reference signal), the less likely cross-coupling may occur between signals.

Figure 13:
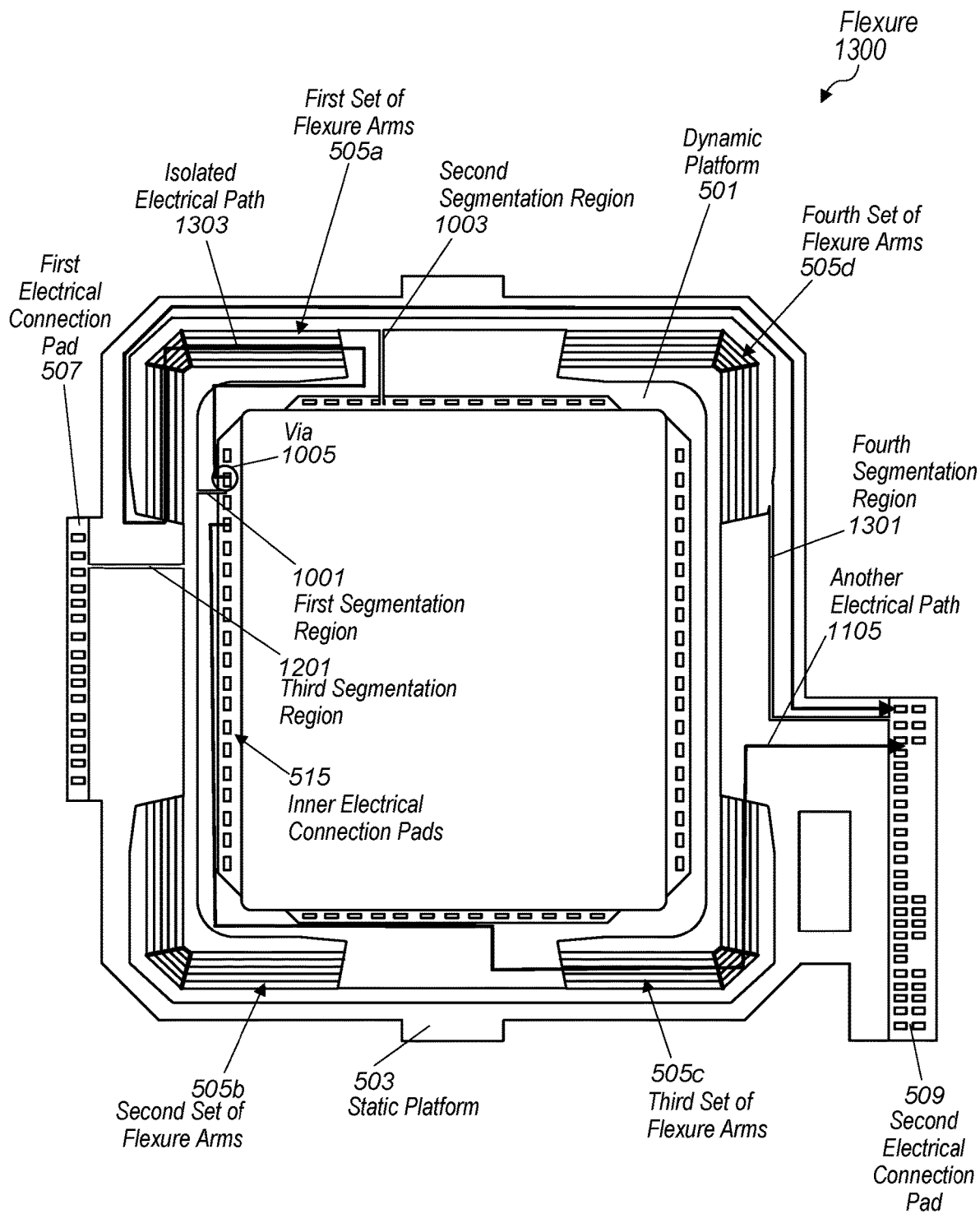
FIG. 13 illustrates an overhead view of another example flexure with multiple segmentation regions segmenting an electrical communication layer, in accordance with some embodiments.

FIG. 13 illustrates an overhead view of another example flexure with multiple segmentation regions segmenting an electrical communication layer, in accordance with some embodiments. The flexure 1300 may be combined with and/or include one or more same or similar features as the features described with respect to or illustrated in FIGS. 1, 2, 3, 4A, 4B, 5, 6A, 6B, 7, 8, 9, 10, 11, 12, 14A, 14B, 14C, 14D, 15, and 16. As shown in FIG. 13, the flexure 1300 includes the dynamic platform 501, the static platform 503, the plurality of sets of flexure arms including the first set of flexure arms 505*a*, the second set of flexure arms 505*b*, the third set of flexure arms 505*c*, and the fourth set of flexure arms 505*d*, the first set of electrical connection pads 507, the second set of electrical connection pads 509, and the set of inner electrical connection pads 515. The first set of electrical connection pads 507 and/or the second set of electrical connection pads 509 may be used to connect the flexure 1300 (e.g., and an image sensor in electronic communication with the flexure 1300, one or more electronic components in electronic communication with the flexure 1300) and one or more other electronic systems of a camera. The set of inner electrical connection pads 515 may be used to connect one or more electrical components (e.g., an AF driver) on a substrate (attached to the dynamic platform 501) and/or an image sensor to the 1300 flexure.

In some aspects, a flexure may include one or more segmentation regions. For example, as shown in FIG. 13, the flexure 1300 may include the first segmentation region 1001, the second segmentation region 1003, the third segmentation region 1201, and a fourth segmentation region 1301. The first segmentation region 1001, the second segmentation region 1003, the third segmentation region 1201, and the fourth segmentation region 1301 may be same as or at least similar to the segmentation region 610 illustrated in FIG. 6A and/or the segmentation region 664 illustrated in FIG. 6B. As described herein, the first segmentation region 1001, the second segmentation region 1003, the third segmentation region 1201, and the fourth segmentation region 1301 may divide a second conductive layer (e.g., below a first conductive layer) into an isolated portion of the second conductive layer (e.g., isolated portion of the second conductive layer 612 of FIG. 6A, isolated portion of the second conductive layer 668 of FIG. 6B) and a remaining portion of the second conductive layer (e.g., remaining portion of the second conductive layer 614 of FIG. 6A, remaining portion of the second conductive layer 670 of FIG. 6B) so that the isolated portion of the second conductive layer may communicate a ground reference signal originating from a first electrical component in isolation (e.g., electrical isolation, physical isolation) through at least a portion of the flexure 1300. In some aspects, the first segmentation region 1001, the second segmentation region 1003, the third segmentation region 1201, and the fourth segmentation region 1301 may form an isolated electrical path 1303 and the other electrical path 1105 through the second conductive layer. For example, the isolated electrical path 1303 may provide electrical communication through the isolated portion of the second conductive layer formed by the first segmentation region 1001, the second segmentation region 1003, the third segmentation region 1201, and the fourth segmentation region 1301 while the other electrical path 1105 may provide electrical communication through the remaining portion of the second conductive layer.

As shown in FIG. 13, the isolated electrical path 1303 may receive a signal (e.g., a ground reference signal) through the via 1005 from one or more pads of the inner electrical connection pads 515. The isolated electrical path 1303 extending through the second conductive layer of the dynamic platform 501 through the first set of flexure arms 505*a*, around the static platform 503, and to one or more pads of the second electrical connection pads 509 on the isolated portion of the second conductive layer may communicate the signal to the location on the static platform 503 connected with the one or more pads of the second electrical connection pads 509 while the other electrical path 1105 may provide electrical communication through the remaining portion of the second conductive layer and one or more other sets of flexure arms. In this case, a ground reference signal communicating through the isolated electrical path 1303 may have little cross-coupling with another ground reference signal communicating through the other electrical path 1105 because the isolated electrical path 1303 remains isolated across the flexure 1300. With this configuration, the first segmentation region 1001, the second segmentation region 1003, the third segmentation region 1201, and the fourth segmentation region 1301 may mitigate at least some cross-coupling between a ground reference signal communicating through the isolated electrical path 1303 and another signal (e.g., another ground reference signal) communicating through the other electrical path 1105.

As described herein, with multiple component systems, one or more of the components (e.g., an image sensor, AF drivers, OIS drivers) may utilize separate and/or isolated electrical communication paths to communicate ground reference signals in order to mitigate cross-coupling between ground reference signals. For example, a ground reference signal from an AF driver that is not separate and/or isolated (e.g., electrically) from a ground reference signal from an image sensor may reduce the image quality of an image captured by the image sensor due to cross-coupling between the ground reference signals. In addition, the longer the distance that electrical communication paths are separated and/or isolated from each other, the less frequent cross-coupling between ground reference signals may occur. Thus, for example, when a ground reference signal from an AF driver is separated from and/or isolated from a ground reference signal from an image sensor for a short distance (e.g., relative to the total distance of the electrical communication path), cross-coupling between ground reference signals may occur more often compared to when the ground reference signal form the AF drive is separated from and/or isolated from the ground reference signal from an image sensor for a longer distance (e.g., relative to the total distance of the electrical communication path). As another example, because the isolated electrical path 1303 illustrated in FIG. 13 is isolated for a greater distance than the isolated electrical path 1101 illustrated in FIG. 11 and the isolated electrical path 1203 illustrated in FIG. 12, cross-coupling between ground reference signals may occur less often on isolated electrical path 1303 compared to the isolated electrical path 1101 and the isolated path 1203. Accordingly, the longer an electrical communication path separates and/or isolates a ground reference signal from another electrical communication path carrying another signal (e.g., another ground reference signal), the less likely cross-coupling may occur between signals.

FIGS. 14A, 14B, 14C, and 14D illustrate an example method 1400 of forming a segmentation region, in accordance with some embodiments. The features and method steps described with respect to method 1400 may be combined with and/or include one or more same or similar features as the features described with respect to or illustrated in FIGS. 1, 2, 3, 4A, 4B, 5, 6A, 6B, 7, 8, 9, 10, 11, 12, 13, 15, and 16. As described herein, a segmentation region (e.g., segmentation region 457 illustrated in FIG. 4B, segmentation region 551 illustrated in FIGS. 5, 7, 8, 9, segmentation region 610 illustrated in FIG. 6A, segmentation region 664 illustrated in FIG. 6B, second segmentation region 801 illustrated in FIGS. 8 and 9, third segmentation region 901 illustrated in FIG. 9, first segmentation region 1001 illustrated in FIGS. 10, 11, 12, and 13, second segmentation region 1003 illustrated in FIGS. 10, 11, 12, and 13, third segmentation region 1201 illustrated in FIGS. 12 and 13, and/or fourth segmentation region 1301 illustrated in FIG. 13) may include an empty space (e.g., a vacuum, filed with a gas) or an insulating material (e.g., polyimide). In some aspects, a segmentation region, as described herein, may include both an insulating material and an empty portion. A segmentation region with both an insulating material and an empty portion may use the insulating material to strengthen the opening.

Figure 14A:
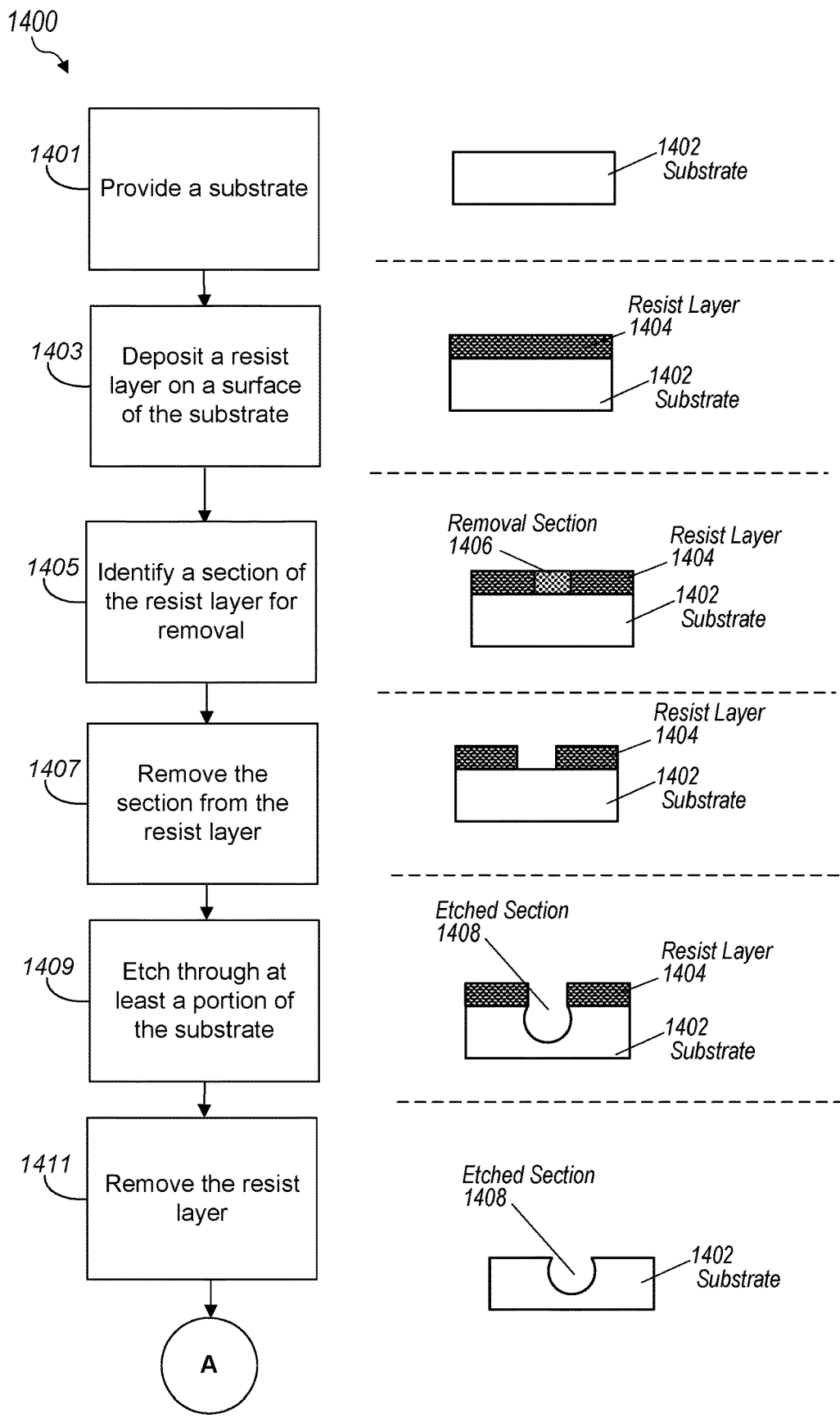
FIG. 14A illustrates steps of an example method of forming a segmentation region, in accordance with some embodiments.

The method 1400 may used to form a segmentation region having both an insulating material and an empty portion. As shown in FIG. 14A, at step 1401, a substrate 1402 may be provided. The substrate 1402 may be a base layer or a second conductive layer as described herein. At step 1403, a resist layer 1404 may deposited on a surface (e.g., a top surface) of the substrate 1402. At step 1405, a section 1406 of the resist layer 1404 may be identified for removal. At step 1407, the section 1406 of the resist layer 1404 may be removed from the resist layer 1404. At step 1409, a portion of the substrate 1402 may be etched through via an empty section formed by the removal of the section 1406 of the resist layer 1404 forming an etched section 1408 in the substrate 1402. Etching through only a portion of the substrate 1402 (e.g., a thickness of the substrate 1402) rather than the entire substrate 1402 may be provide better etching control. At step 1411, the resist layer 1404 may be removed from the substrate 1402.

Figure 14B:
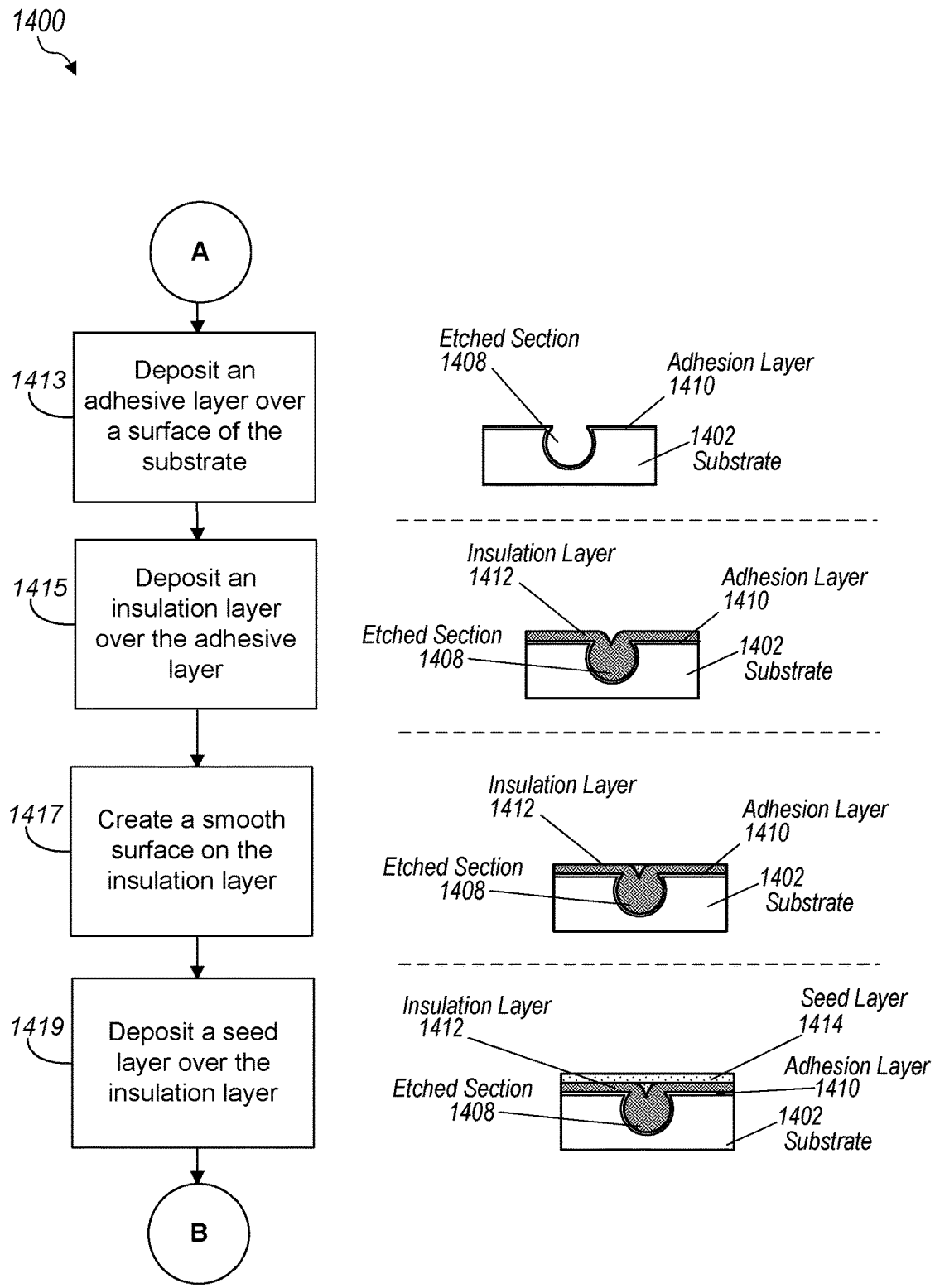
FIG. 14B illustrates steps of an example method of forming a segmentation region, in accordance with some embodiments.

As shown in FIG. 14B, at step 1413, an adhesion layer 1410 may be deposited over a surface (e.g., a top surface) of the substrate 1404. The adhesion layer 1410 may be used for adhering an insulation material to the substrate 1404. At step 1415, an insulation layer 1412 (e.g., an insulation material, polyimide) may be deposited over the adhesion layer 1410 and filling the etched section 1408 of the substrate 1402. At step 1417, a smooth surface may be formed on a top side of the insulation layer 1412 and the insulation layer 1412 may be permitted to cure and/or solidify. At step 1419, a seed layer 1414 may be deposited over the insulation layer 1412. The seed layer 1414 may be used to prevent a routing layer (e.g., a first conductive layer, one or more signal traces) from delamination.

Figure 14C:
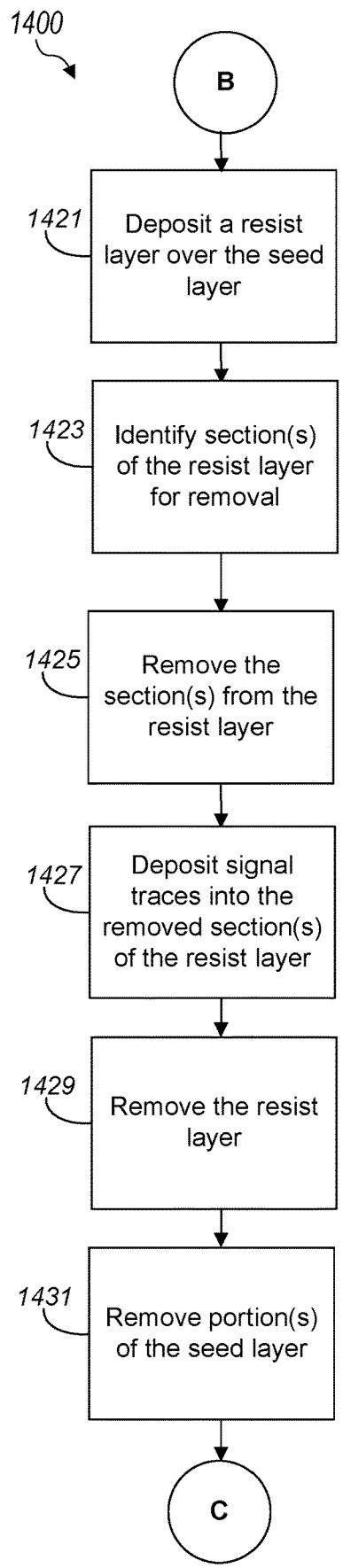
FIG. 14C illustrates steps of an example method of forming a segmentation region, in accordance with some embodiments.
Figure 14C:
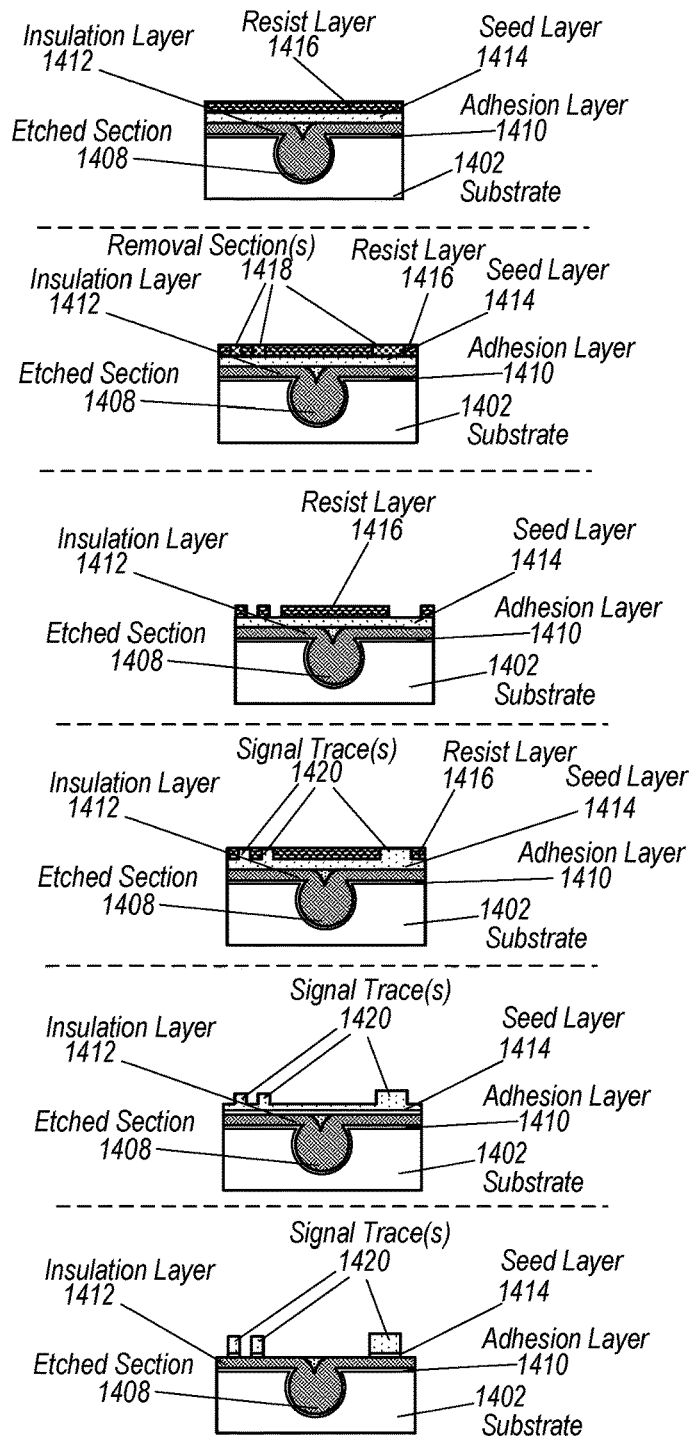

As shown in FIG. 14C, at step 1421, a resist layer 1416 may be deposited over the seed layer 1414. At step 1423, one or more sections 1418 of the resist layer 1416 may be identified for removal from the resist layer 1416. At step 1425, the one or more sections 1418 may be removed from the resist layer 1416 forming one or more empty sections in the resist layer 1416. At step 1427, one or more signal traces 1420 (e.g., a first conductive layer, routing layer) may be deposited in the empty section of the resist layer 1416 formed by removal of the one or more sections 1418. The one or more signal traces 1420 may bond with the seed layer 1414. At step 1429, the resist layer 1416 may be removed leaving the one or more signal traces 1420 remaining. At step 1431, one or more portions of the seed layer 1414 may be removed. For example, one or more portions of the seed layer 1414 that are not beneath the signal traces 1420 may be removed while remaining portions of the seed layer 1414 may remain beneath the signal traces 1420 mitigating delamination of the signal traces 1420 from the insulation layer 1412.

Figure 14D:
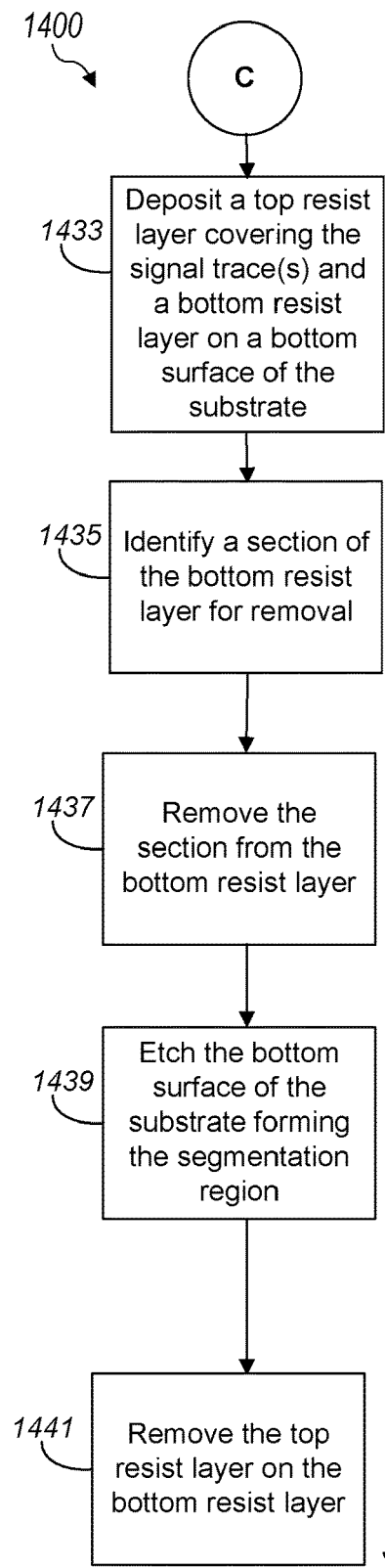
FIG. 14D illustrates steps of an example method of forming a segmentation region, in accordance with some embodiments.
Figure 14D:
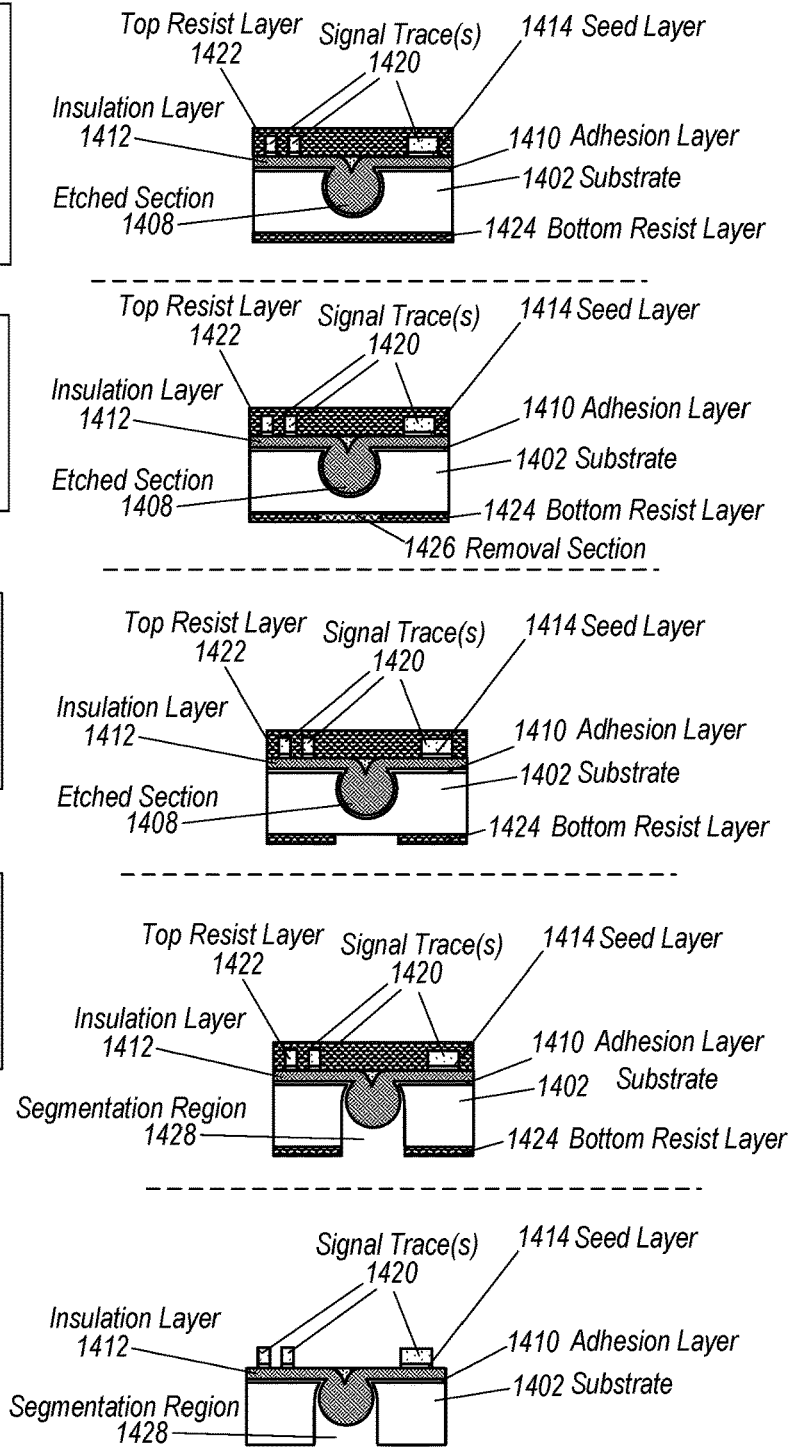

As shown in FIG. 14D, at step 1433, a top resist layer 1422 may be deposited over the insulation layer 1412 and the signal traces 1420 covering the signal traces 1420 and a bottom resist layer 1424 may be deposited on a bottom surface of the substrate 1402 opposite the substrate 1402 from the insulation layer 1412. At step 1435, a section 1426 of the bottom resist layer 1424 may be identified for removal. At step 1437, the section 1426 of the bottom resist layer 1424 may be removed from the bottom resist layer 1424. At step 1439, at least another portion of the substrate 1402 may be etched through via an empty section formed by the removal of the section 1426 of the bottom resist layer 1424. Etching through only a portion of the substrate 1402 (e.g., a thickness of the substrate 1402) rather than the entire substrate 1402 may be provide better etching control. The substrate 1402 may be etch to the insulation filling the etched section 1408. Etching through the substrate 1402 to the insulation filling the etched section 1408 may form a segmentation region 1428 in the substrate 1402. Having the insulation fill the etched section 1408 which is a portion of the segmentation region 1428 while allowing a remaining portion of the segmentation region 1428 to remain empty provides a stronger or sturdy opening forming and maintaining the segmentation region 1428 while also avoiding a back fill process which may further complicate the manufacturing process. At step 1441, the top resist layer 1422 may be removed from the insulation layer 1412 and the signal traces 1418 and the bottom resist layer 1424 may be removed from substrate 1402.

Figure 15:
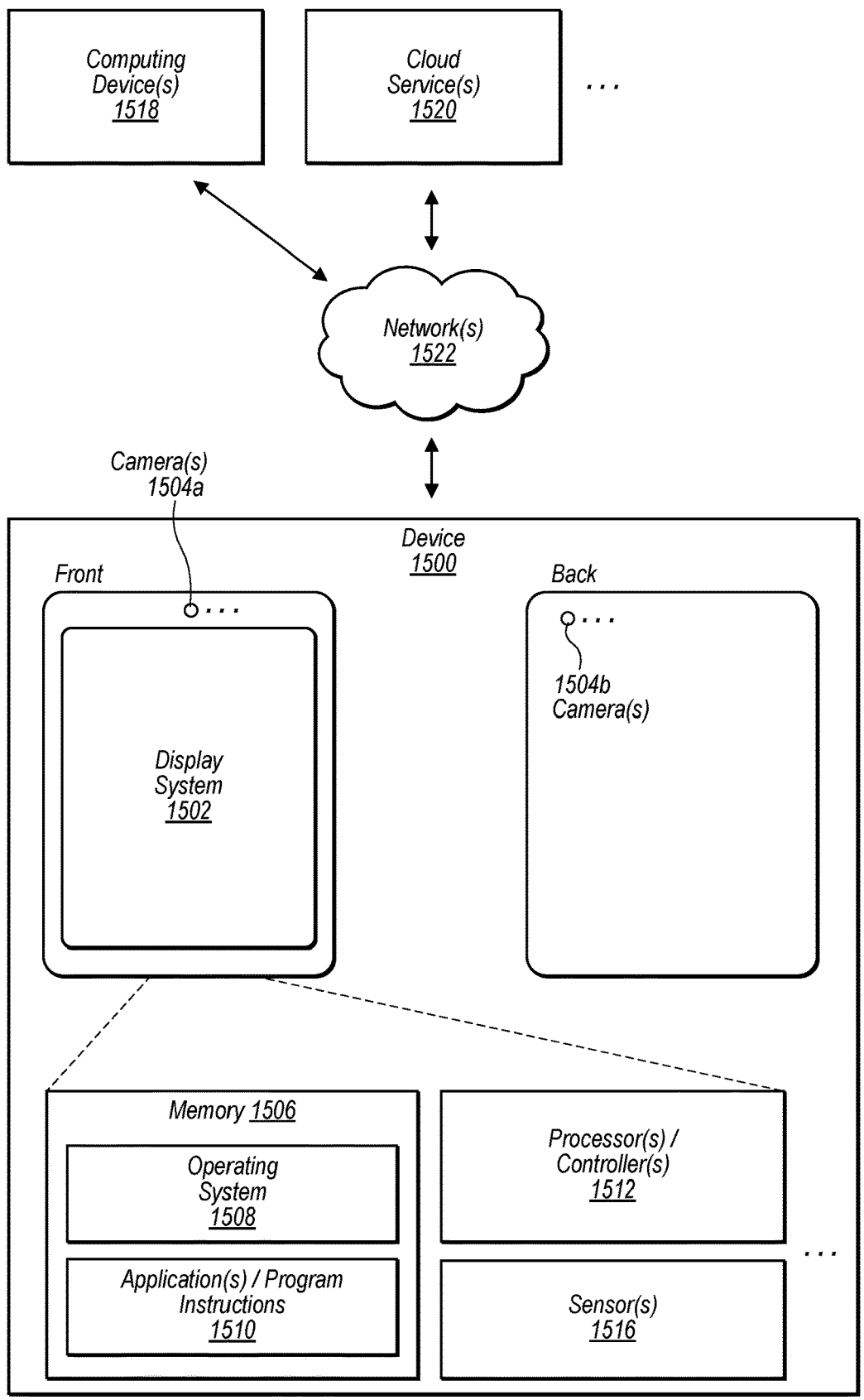
FIG. 15 illustrates a schematic representation of an example device that may include a camera, in accordance with some embodiments.

FIG. 15 illustrates a schematic representation of an example device 1500 that may include a camera (e.g., as described herein with respect to FIGS. 1, 2, 3, 4A, 4B, 5, 6A, 6B, 7, 8, 9, 10, 11, 12, 13, 14A, 14B, 14C, 14D, and 16), in accordance with some embodiments. In some embodiments, the device 1500 may be a mobile device and/or a multifunction device. In various embodiments, the device 1500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1500 may include a display system 1502 (e.g., comprising a display and/or a touch-sensitive surface) and/or one or more cameras 1504. In some non-limiting embodiments, the display system 1502 and/or one or more front-facing cameras 1504a may be provided at a front side of the device 1500, e.g., as indicated in FIG. 15. Additionally, or alternatively, one or more rear-facing cameras 1504b may be provided at a rear side of the device 1500. In some embodiments comprising multiple cameras 1504, some or all of the cameras may be the same as, or similar to, each other. Additionally, or alternatively, some or all of the cameras may be different from each other. In various embodiments, the location(s) and/or arrangement(s) of the camera(s) 1504 may be different than those indicated in FIG. 15.

Among other things, the device 1500 may include memory 1506 (e.g., comprising an operating system 1508 and/or application(s)/program instructions 1510), one or more processors and/or controllers 1512 (e.g., comprising CPU(s), memory controller(s), display controller(s), and/or camera controller(s), etc.), and/or one or more sensors 1516 (e.g., orientation sensor(s), proximity sensor(s), and/or position sensor(s), etc.). In some embodiments, the device 1500 may communicate with one or more other devices and/or services, such as computing device(s) 1518, cloud service(s) 1520, etc., via one or more networks 1522. For example, the device 1500 may include a network interface (e.g., network interface 1510) that enables the device 1500 to transmit data to, and receive data from, the network(s) 1522. Additionally, or alternatively, the device 1500 may be capable of communicating with other devices via wireless communication using any of a variety of communications standards, protocols, and/or technologies.

Figure 16:
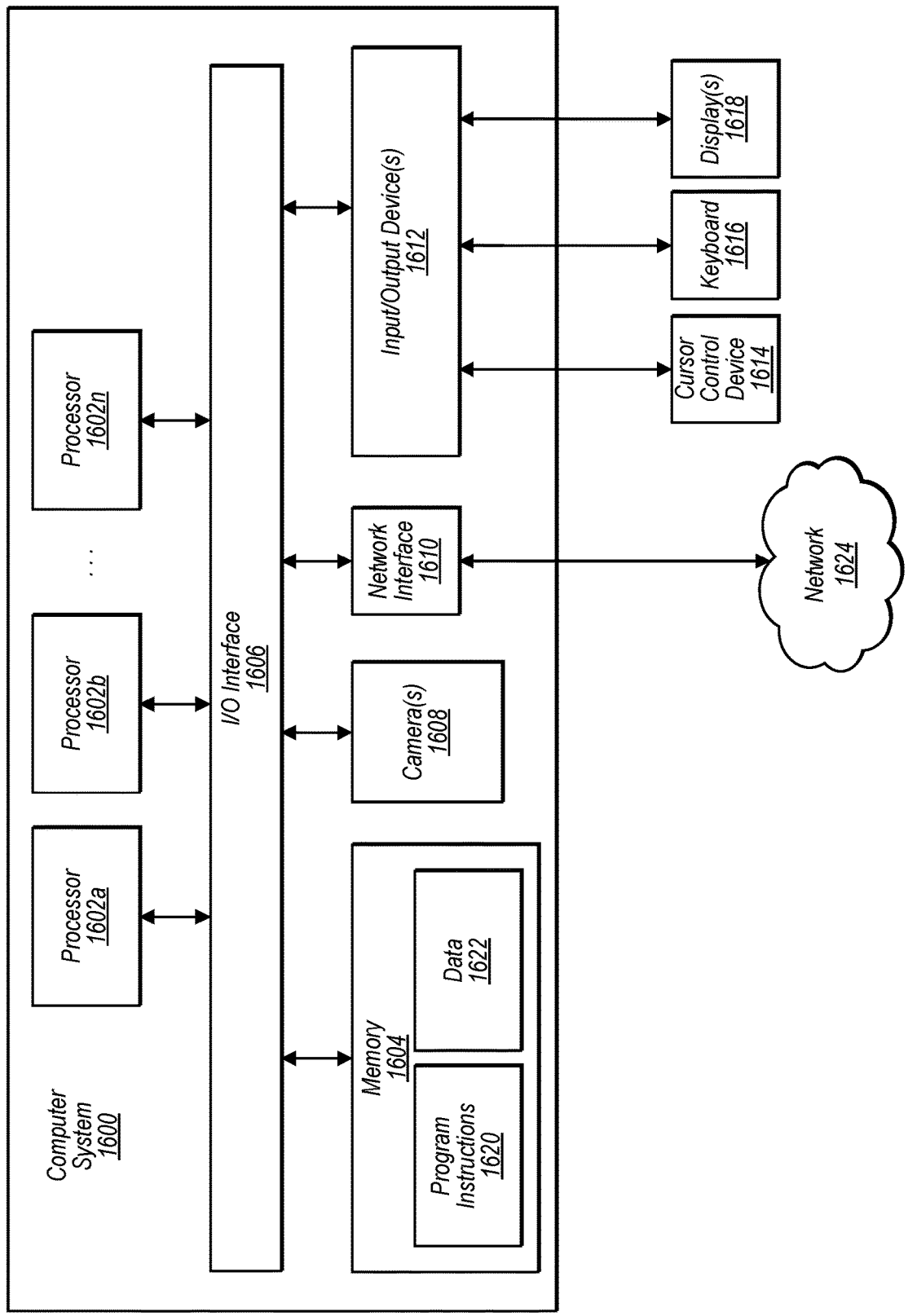
FIG. 16 illustrates a schematic block diagram of an example computing device, referred to as computer system, that may include or host embodiments of a camera, in accordance with some embodiments.

FIG. 16 illustrates a schematic block diagram of an example computing device, referred to as computer system 1600, that may include or host embodiments of a camera (e.g., as described herein with respect to FIGS. 1, 2, 3, 4A, 4B, 5, 6A, 6B, 7, 8, 9, 10, 11, 12, 13, 14A, 14B, 14C, 14D, and 15). In addition, computer system 1600 may implement methods for controlling operations of the camera and/or for performing image processing images captured with the camera. In some embodiments, the device 1600 (described herein with reference to FIG. 16) may additionally, or alternatively, include some or all of the functional components of the computer system 1600 described herein.

The computer system 1600 may be configured to execute any or all of the embodiments described above. In different embodiments, computer system 1600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1600 includes one or more processors 1602 coupled to a system memory 1604 via an input/output (I/O) interface 1606. Computer system 1600 further includes one or more cameras 1608 coupled to the I/O interface 1606. Computer system 1600 further includes a network interface 1610 coupled to I/O interface 1606, and one or more input/output devices 1612, such as cursor control device 1614, keyboard 1616, and display(s) 1618. In some cases, it is contemplated that embodiments may be implemented using a single instance of computer system 1600, while in other embodiments multiple such systems, or multiple nodes making up computer system 1600, may be configured to host different portions or instances of embodiments. For example, in one embodiment some elements may be implemented via one or more nodes of computer system 1600 that are distinct from those nodes implementing other elements.

In various embodiments, computer system 1600 may be a uniprocessor system including one processor 1602, or a multiprocessor system including several processors 1602 (e.g., two, four, eight, or another suitable number). Processors 1602 may be any suitable processor capable of executing instructions. For example, in various embodiments processors 1602 may be general-purpose or embedded processors implementing any of a variety of instruction set architectures (ISAs), such as the x86, PowerPC, SPARC, or MIPS ISAs, or any other suitable ISA. In multiprocessor systems, each of processors 1602 may commonly, but not necessarily, implement the same ISA.

System memory 1604 may be configured to store program instructions 1620 accessible by processor 1602. In various embodiments, system memory 1604 may be implemented using any suitable memory technology, such as static random access memory (SRAM), synchronous dynamic RAM (SDRAM), nonvolatile/Flash-type memory, or any other type of memory. Additionally, existing camera control data 1622 of memory 1604 may include any of the information or data structures described above. In some embodiments, program instructions 1620 and/or data 1622 may be received, sent or stored upon different types of computer-accessible media or on similar media separate from system memory 1604 or computer system 1600. In various embodiments, some or all of the functionality described herein may be implemented via such a computer system 1600.

In one embodiment, I/O interface 1606 may be configured to coordinate I/O traffic between processor 1602, system memory 1604, and any peripheral devices in the device, including network interface 1610 or other peripheral interfaces, such as input/output devices 1612. In some embodiments, I/O interface 1606 may perform any necessary protocol, timing or other data transformations to convert data signals from one component (e.g., system memory 1604) into a format suitable for use by another component (e.g., processor 1602). In some embodiments, I/O interface 1606 may include support for devices attached through various types of peripheral buses, such as a variant of the Peripheral Component Interconnect (PCI) bus standard or the Universal Serial Bus (USB) standard, for example. In some embodiments, the function of I/O interface 1606 may be split into two or more separate components, such as a north bridge and a south bridge, for example. Also, in some embodiments some or all of the functionality of I/O interface 1606, such as an interface to system memory 1604, may be incorporated directly into processor 1602.

Network interface 1610 may be configured to allow data to be exchanged between computer system 1600 and other devices attached to a network 1624 (e.g., carrier or agent devices) or between nodes of computer system 1600. Network 1624 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1610 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1612 may, in some embodiments, include one or more display terminals, keyboards, keypads, touchpads, scanning devices, voice or optical recognition devices, or any other devices suitable for entering or accessing data by one or more computer systems 1600. Multiple input/output devices 1612 may be present in computer system 1600 or may be distributed on various nodes of computer system 1600. In some embodiments, similar input/output devices may be separate from computer system 1600 and may interact with one or more nodes of computer system 1600 through a wired or wireless connection, such as over network interface 1610.

Those skilled in the art will appreciate that computer system 1600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1600 may be transmitted to computer system 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:
1. A camera, comprising:
a lens group;
an image sensor;
an actuator to move the image sensor relative to the lens group; and a flexure that suspends the image sensor from a stationary structure of the camera and that allows motion of the image sensor enabled by the actuator, the flexure comprising:
  a dynamic platform to which the image sensor and a substrate are connected such that the image sensor and the substrate move together with the dynamic platform, wherein a driver associated with the actuator is mounted to the substrate,
  a static platform connected to a static portion of the camera,
  a plurality of flexure arms that mechanically connect the dynamic platform to the static platform,
  a routing layer and a base layer both at least partially forming the dynamic platform, the static platform, and the plurality of flexure arms, and
  at least one segmentation region extending through the base layer and configured to physically isolate a return current from the driver and through the base layer from a return current from the image sensor and through the base layer.

2. The camera of claim 1, wherein the at least one segmentation region comprises one or more etches extending through the base layer.

3. The camera of claim 1, wherein the at least one segmentation region is located adjacent a connection location between the dynamic platform and a first set of flexure arms of the plurality of flexure arms.

4. The camera of claim 3, further comprising a via that extends between the routing layer and the base layer at a location adjacent the at least one segmentation region.

5. The camera of claim 3, wherein the at least one segmentation region forms an isolated base layer portion for communicating the return current from the driver, wherein the isolated base layer portion extends from the at least one segmentation region and through the first set of flexure arms.

6. The camera of claim 3, wherein the at least one segmentation region forms an isolated base layer portion for communicating the return current from the driver, wherein the isolated base layer portion extends from the at least one segmentation region and through the first set of flexure arms, and through at least a portion of the static platform.

7. The camera of claim 3, wherein the at least one segmentation region forms an isolated base layer portion for communicating the return current from the driver, wherein the isolated base layer portion extends from the at least one segmentation region and through the first set of flexure arms and at least a portion of the static platform, and to one or more electrical connection points of the static platform.

8. The camera of claim 3, wherein the at least one segmentation region forms an isolated base layer portion for communicating the return current from the driver, wherein the isolated base layer portion is isolated at a pad location adjacent one or more surface mounted (SMT) pads connected to the routing layer on the dynamic platform.

9. The camera of claim 8, further comprising a via that extends between the routing layer and the isolated base layer portion from an SMT pad of the one or more SMT pads.

10. A device, comprising:
  one or more processors;
  memory storing program instructions executable by the one or more processors to control operation of a camera; and
  the camera comprising:
    a lens group;
    an image sensor;
    an actuator to move the image sensor relative to the lens group; and
    a flexure that suspends the image sensor from a stationary structure of the camera and that allows motion of the image sensor enabled by the actuator, the flexure comprising:
      a dynamic platform to which the image sensor and a substrate are connected such that the image sensor and the substrate move together with the dynamic platform, wherein a driver associated with the actuator is mounted to the substrate,
      a static platform connected to a static portion of the camera,
      a plurality of flexure arms that mechanically connect the dynamic platform to the static platform,
      a routing layer and a base layer both at least partially forming the dynamic platform, the static platform, and the plurality of flexure arms,
      at least one segmentation region extending through the base layer and configured to physically isolate a return current from the driver and through the base layer from a return current from the image sensor and through the base layer.

11. The device of claim 10, wherein the at least one segmentation region comprises one or more etches extending through the base layer.

12. The device of claim 10, wherein the at least one segmentation region is located adjacent a connection location between the dynamic platform and a first set of flexure arms of the plurality of flexure arms.

13. The device of claim 12, further comprising a via that extends between the routing layer and the base layer at a location adjacent the at least one segmentation region.

14. The device of claim 12, wherein the at least one segmentation region forms an isolated base layer portion for communicating the return current from the driver, wherein the isolated base layer portion extends from the at least one segmentation region and through the first set of flexure arms.

15. The device of claim 12, wherein the at least one segmentation region forms an isolated base layer portion for communicating the return current from the driver, wherein the isolated base layer portion extends from the at least one segmentation region and through the first set of flexure arms, and through at least a portion of the static platform.

16. The device of claim 12, wherein the at least one segmentation region forms an isolated base layer portion for communicating the return current from the driver, wherein the isolated base layer portion extends from the at least one segmentation region and through the first set of flexure arms and at least a portion of the static platform, and to one or more electrical connection points of the static platform.

17. The device of claim 12, wherein the at least one segmentation region forms an isolated base layer portion for communicating the return current from the driver, wherein the isolated base layer portion is isolated at a pad location adjacent one or more surface mounted (SMT) pads connected to the routing layer on the dynamic platform.

18. The device of claim 17, further comprising a via that extends between the routing layer and the isolated base layer portion from an SMT pad of the one or more SMT pads.

19. A flexure for a camera module, comprising:
  a dynamic platform to which an image sensor and a substrate are connected such that the image sensor and the substrate move together with the dynamic platform, wherein a driver associated with an actuator is mounted to the substrate;

a static platform configured to connect to a static portion of the camera module;

a plurality of flexure arms that mechanically connect the dynamic platform to the static platform;

a routing layer and a base layer both at least partially forming the dynamic platform, the static platform, and the plurality of flexure arms; and at least one segmentation region extending through the base layer and configured to physically isolate a return current from the driver and through the base layer from a return current from the image sensor and through the base layer.

20. The flexure of claim 19, wherein the at least one segmentation region comprises one or more etches extending through the base layer.

* * * * *